US007623674B2

(12) United States Patent
Nichani et al.

(10) Patent No.: US 7,623,674 B2
(45) Date of Patent: Nov. 24, 2009

(54) METHOD AND SYSTEM FOR ENHANCED PORTAL SECURITY THROUGH STEREOSCOPY

(75) Inventors: Sanjay Nichani, San Diego, CA (US);
Cyril C. Marrion, Jr., Acton, MA (US);
Robert Wolff, Sherborn, MA (US);
David Shatz, Noodham, MA (US);
Raymond A. Fix, Natick, MA (US);
Gene Halbrooks, Leominster, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 779 days.

(21) Appl. No.: 10/702,059

(22) Filed: Nov. 5, 2003

(65) Prior Publication Data

US 2005/0093697 A1    May 5, 2005

(51) Int. Cl.
*G06K 9/00* (2006.01)
*H04N 13/02* (2006.01)
*H04N 7/18* (2006.01)
*G08B 13/08* (2006.01)
*G08B 23/00* (2006.01)

(52) U.S. Cl. .............. 382/103; 382/106; 382/154; 348/47; 348/156; 340/545.1; 340/550; 340/573.1

(58) Field of Classification Search ................ 382/103, 382/106, 154; 348/47, 48, 143, 150, 152, 348/153, 156; 340/540, 545.1, 545.3, 550, 340/573.1
See application file for complete search history.

(56) References Cited

U.S. PATENT DOCUMENTS

| 3,727,034 | A | 4/1973 | Pope |
| 3,779,178 | A | 12/1973 | Riseley |
| 4,000,400 | A | 12/1976 | Elder |
| 4,303,851 | A | 12/1981 | Mottier |
| 4,382,255 | A | * | 5/1983 | Pretini | ............ 109/3 |
| 4,799,243 | A | | 1/1989 | Zepke |
| 4,847,485 | A | | 7/1989 | Koelsch |

(Continued)

FOREIGN PATENT DOCUMENTS

| EP | 0 847 030 A2 | 6/1998 |
| EP | 0 847 030 A3 | 12/1999 |
| EP | 0 706 062 B1 | 5/2001 |
| EP | 0 817 123 | 9/2001 |
| WO | WO 96/31047 | 10/1996 |

(Continued)

OTHER PUBLICATIONS

R. Y.Tsai, "A Versatile Camera Calibration Technique for High-Accuracy 3D Machine Vision Metrology using off-the-shelf TV Cameras and Lenses," IEEE J. Robotics and Automation, vol. 3, No. 4, pp. 323-344.

(Continued)

*Primary Examiner*—Brian P Werner
*Assistant Examiner*—Anthony MacKowey
(74) *Attorney, Agent, or Firm*—Hamilton Brooks Smith & Reynolds

(57) ABSTRACT

Enhanced portal security is provided through stereoscopy, including a stereo door sensor for detecting and optionally preventing access violations, such as piggybacking and tailgating. A portal security system can include a 3D imaging system that generates a target volume from plural 2D images of a field of view about a portal; and a processor that detects and tracks people candidates moving through the target volume to detect a portal access event.

36 Claims, 27 Drawing Sheets

U.S. PATENT DOCUMENTS

| | | | |
|---|---|---|---|
| 4,998,209 | A | 3/1991 | Vuichard et al. |
| 5,097,454 | A * | 3/1992 | Schwarz et al. ............... 367/93 |
| 5,201,906 | A | 4/1993 | Schwarz et al. |
| 5,387,768 | A * | 2/1995 | Izard et al. ................. 187/392 |
| 5,432,712 | A | 7/1995 | Chan |
| 5,519,784 | A | 5/1996 | Vermeulen et al. |
| 5,559,551 | A | 9/1996 | Sakamoto et al. |
| 5,565,918 | A | 10/1996 | Homma et al. |
| 5,581,625 | A | 12/1996 | Connell |
| 5,866,887 | A | 2/1999 | Hashimoto et al. |
| 5,880,782 | A | 3/1999 | Koyanagi et al. |
| 6,028,626 | A * | 2/2000 | Aviv ......................... 348/152 |
| 6,081,619 | A | 6/2000 | Hashimoto et al. |
| 6,173,070 | B1 | 1/2001 | Michael et al. |
| 6,195,102 | B1 | 2/2001 | McNeil et al. |
| 6,205,233 | B1 | 3/2001 | Morley et al. |
| 6,205,242 | B1 * | 3/2001 | Onoguchi ................... 382/154 |
| 6,215,898 | B1 | 4/2001 | Woodfill et al. |
| 6,226,396 | B1 | 5/2001 | Marugame et al. |
| 6,295,367 | B1 | 9/2001 | Crabtree et al. |
| 6,297,844 | B1 | 10/2001 | Schatz |
| 6,301,440 | B1 | 10/2001 | Bolle et al. |
| 6,307,951 | B1 | 10/2001 | Tanigawa et al. |
| 6,308,644 | B1 | 10/2001 | Diaz |
| 6,345,105 | B1 | 2/2002 | Nitta et al. |
| 6,408,109 | B1 | 6/2002 | Silver |
| 6,469,734 | B1 | 10/2002 | Nichani et al. |
| 6,496,204 | B1 * | 12/2002 | Nakamura ................... 715/781 |
| 6,496,220 | B2 | 12/2002 | Landert et al. |
| 6,678,394 | B1 | 1/2004 | Nichani |
| 6,690,354 | B2 | 2/2004 | Sze |
| 6,701,005 | B1 | 3/2004 | Nichani |
| 6,710,770 | B2 | 3/2004 | Tomasi et al. |
| 6,720,874 | B2 | 4/2004 | Fufido et al. |
| 6,756,910 | B2 | 6/2004 | Ohba et al. |
| 6,791,461 | B2 | 9/2004 | Oku et al. |
| 6,919,549 | B2 | 7/2005 | Bamji et al. |
| 6,940,545 | B1 | 9/2005 | Ray et al. |
| 6,963,661 | B1 | 11/2005 | Hattori et al. |
| 6,999,600 | B2 | 2/2006 | Venetianer et al. |
| 7,003,136 | B1 | 2/2006 | Harville |
| 7,058,204 | B2 * | 6/2006 | Hildreth et al. ............. 382/103 |
| 7,088,236 | B2 * | 8/2006 | Sorensen ............... 340/539.13 |
| 7,146,028 | B2 | 12/2006 | Lestideau |
| 7,260,241 | B2 | 8/2007 | Fukuhara et al. |
| 7,382,895 | B2 | 6/2008 | Bramblet et al. |
| 7,471,846 | B2 | 12/2008 | Steinberg et al. |
| 2001/0010731 | A1 * | 8/2001 | Miyatake et al. ............ 382/103 |
| 2001/0030689 | A1 | 10/2001 | Spinelli |
| 2002/0039135 | A1 | 4/2002 | Heyden |
| 2002/0041698 | A1 | 4/2002 | Ito et al. |
| 2002/0113862 | A1 | 8/2002 | Center et al. |
| 2002/0118113 | A1 | 8/2002 | Oku et al. |
| 2002/0118114 | A1 | 8/2002 | Ohba et al. |
| 2002/0135483 | A1 | 9/2002 | Merheim et al. |
| 2002/0191819 | A1 * | 12/2002 | Hashimoto et al. .......... 382/118 |
| 2003/0053660 | A1 | 3/2003 | Heyden |
| 2003/0071199 | A1 | 4/2003 | Esping et al. |
| 2003/0164892 | A1 | 9/2003 | Shiraishi et al. |
| 2004/0017929 | A1 * | 1/2004 | Bramblet et al. ............ 382/103 |
| 2004/0045339 | A1 | 3/2004 | Nichani et al. |
| 2004/0061781 | A1 | 4/2004 | Fennell et al. |
| 2004/0086152 | A1 | 5/2004 | Kakarala et al. |
| 2004/0153671 | A1 | 8/2004 | Schuyler et al. |
| 2004/0218784 | A1 | 11/2004 | Nichani et al. |
| 2005/0074140 | A1 * | 4/2005 | Grasso et al. ............... 382/103 |
| 2005/0078853 | A1 | 4/2005 | Buehler et al. |
| 2005/0105765 | A1 | 5/2005 | Han et al. |
| 2005/0128314 | A1 | 6/2005 | Ishino |
| 2006/0170769 | A1 | 8/2006 | Zhou |
| 2006/0244403 | A1 | 11/2006 | Christensson |

FOREIGN PATENT DOCUMENTS

| | | |
|---|---|---|
| WO | WO 96/38820 | 12/1996 |
| WO | WO 98/08208 | 2/1998 |
| WO | WO 01/75809 | 10/2001 |
| WO | WO 02/48971 | 6/2002 |
| WO | WO 02/095692 | 11/2002 |

OTHER PUBLICATIONS

Z. Zhang, "A Flexible New Technique for Camera Calibration," Technical Report MSR-TR-98-71, Microsoft Research, Microsoft Corporation, pp. 1-22 (Mar. 25, 1999).

T. Kanade et al., "A Stereo Machine for Video-rate Dense Depth Mapping and Its New Applications," Proc. IEEE Computer Vision and Pattern Recognition (CVPR), pp. 196-202.

R.E. Kalman, "A New Approach to Linear Filtering and Prediction Problems," Transactions of the ASME, The Journal of Basic Engineering, 8: 35-45, 1960.

Gurovich Alexander, Fiksman Evgeny, "Automatic Door Control using Motion Recognition", Technion, Israel Institute of Technology, Aug. 1999.

Jeffery S. Norris, "Face Detection and Recognition in Office Environments", Department of Electrical Engineering and Computer Science, Massachusetts Institute of Technology, (May 21, 1999).

Gurovich, Alexander, et al., "Automatic Door Control using Motion Recognition", *Technion, Israel Institute of Technology*, (Aug. 1999).

Kalman, R. E., "A New Approach to Linear Filtering and Prediction Problems", *Transactions of the ASME, The Journal of Basic Engineering*, 8, (1960),pp. 35-45.

Kanade, T., et al., "A Stereo Machine for Video-rate Dense Depth Mapping and Its New Applications", *Proc. IEEE Computer Vision and pattern Recognition*, pp. 196-202.

Norris, Jeffery, "Face Detection and Recognition in Office Environments", *Department fo Electrical Engineering and Computer Science*, Massachusetts Institute of Technology,(May 21, 1999).

Tsai, R. Y., "A Versatile Camera Calibration Technique for High-Accuracy 3D Machine vision Metrology using off-the-shelf TV Cameras and Lenses", *IEEE J. Robotics and Automation*, vol. 3, No. 4, pp. 323-344.

Zhang, Z., "A Flexible New Technique for Camera Calibration", *Technical Report MSR-TR-98-71*, Microsoft Research, Microsoft Corporation,(Mar. 25, 1996),pp. 1-22.

Prati, A., et al., "Detecting Moving Shadows: Algorithms and Evaluations", *IEEE Transactions on Pattern Analysis and Machine Intelligence*, vol. 25, No. 7,(2003),pp. 918-923.

Gluckman, Joshua et al., "Planar Catadioptric Stereo: Geometry and Calibration", IEEE, (1999).

Burschka, et al., "Scene Classification from Dense Disparity Mapis in Indoor Environments", Proceedings of ICPR 2002, (Aug. 2002).

Weng, "Agglomerative Clustering Algorithm", www.speech.sri.com, (1997).

Jain, et al., "Machine Vision", Chapter 11—Depth, MIT Press and McGraw-Hill Inc. 1995,pp. 289-297.

Dhond, et al., "Structure from Stereo—A Review", IEEE Transactions on Systems, Man, and Cybernetics, vol. 19 No. 6,(Dec. 1989).

Pollard, Stephen P., et al., "A Stereo Correspondence Algorithm using a disparity gradient limit", Perception, vol. 14, (1985),449-470.

CSEM SA, Swiss Ranger SR-2 Datasheet, CSEM Technologies for Innovation, www.csem.ch, imaging@csem.ch, Bandenerstrasse 569, CH 8048, Zurich, Switzerland, 2004.

Pilz GmbH & Co., Safe camera system SafetyEye, http://www.pilz.com/products/sensors/camera/f/safetyeye/sub/applications/index.en.jsp.2007.

Roeder-Johnson Corporation, Low-cost, Broadly-Available Computer/Machine Vision Applications Much Closer with New Canesta Development Platform, Press Release, San Jose, CA, Aug. 10, 2004.

CEDES, News from the CEDES World, 2009 newsletters.

Canesta, Inc., Development Platform - DP200, Electronic Perception Technology, Real-time single chip 3D imaging, Jul. 12, 2004.

* cited by examiner

TAILGATING DETECTED AND PREVENTED

TEMPLATE MODEL

CORRESPONDER

METHOD AND SYSTEM FOR ENHANCED PORTAL SECURITY THROUGH STEREOSCOPY

BACKGROUND OF THE INVENTION

Automated and manual security portals provide controlled access to restricted areas. Security portals are usually equipped with card access systems, biometric access systems, or other systems for validating a person's authorization to enter restricted areas. Examples of automated security portals include revolving doors, mantraps, sliding doors, and swinging doors.

SUMMARY OF THE INVENTION

A typical security issue associated with most access controlled portal security systems is that when one person obtains valid access, an unauthorized person may bypass the validation security by "piggybacking" or "tailgating." The concepts of piggybacking and tailgating are illustrated by way of examples involving a revolving door in FIGS. 1A through 1E.

FIG. 1A is a block diagram of an access controlled revolving door according to the prior art. In particular, the revolving door 10 includes a door controller 30 that is coupled to an access control system 20. To pass through the revolving door 10, a person validates his authorization through the access control system 20. The access control system 20 in turn alerts the door controller,30 that valid authorization was received. The revolving door 10 then drives the revolving door 10, and thus potentially enabling unauthorized access to another person as illustrated in FIGS. 1B through 1E.

Piggybacking can occur when an authorized person knowingly or unknowingly provides access through a portal to another traveling in the same direction. For example, FIGS. 1B and 1C are top view diagrams of a revolving door for illustrating the concept of piggybacking. Referring to FIG. 1B, an authorized person P1 is granted valid access to pass through the revolving door 10. As person P1 steps into the entry quadrant 15, an unauthorized person P2 "piggybacks" on the authorized person P1, such that both pass through the revolving doorway in the same direction. Both leave the exit quadrant 17 as shown in FIG. 1C.

Tailgating can occur when an authorized person knowingly or unknowingly provides unauthorized access through a portal to another traveling in the opposite direction. For example, FIGS. 1D and 1E are top view diagrams of a revolving door for illustrating the concept of tailgating. Referring to FIG. 1D, an authorized person P1 is granted valid access to pass through the revolving door 10. As person P1 steps into entry quadrant 15, an unauthorized person P2 waits in entry quadrant 19 for the door to rotate. As the door 10 begins to rotate, person P2 passes through the revolving doorway and leaves the exit quadrant 21 in the opposite direction as shown in FIG. 1E.

Embodiments of the present invention are directed at portal security systems and methods of providing enhanced portal security through stereoscopy. For example, an embodiment of the invention is a stereo door sensor that detects portal access events and optionally prevents access violations, such as piggybacking and tailgating. Generally, prevention of violations is only possible in portals such as a revolving door or the mantrap. Generally, in systems, such as the sliding or swinging door, access violations can only be detected. The stereo door sensor is a video based people sensor that generates three dimensional models from plural two dimensional images of a portal scene and further detects and tracks people candidates moving through a target volume within the model.

Embodiments of a portal security system can include (i) a three dimensional (3D) imaging system that generates a target volume from two dimensional (2D) images of a field of view about a portal and (ii) a processor that detects and tracks people candidates moving through the target volume to detect a portal access event. The portal access events may be a piggyback event, a person event (e.g., a single person or at least one person), or an ambiguous event. The portal can be any type of door, such as a swinging door, a sliding door, a mantrap, or a revolving door.

In a particular embodiment, the portal security system can include (i) plural cameras receiving plural 2D images of a field of view about a portal; (ii) a 3D image generator generating a 3D model from the plural 2D images; (iii) a filter providing a target volume from the 3D model; (iv) a people candidate detector detecting people candidates within the target volume; and (v) a people candidate tracker tracking movement of the people candidates over time to detect portal access events.

In order to focus on an area of interest, the target volume can be less than the field of view. The target volume can also have a depth less than a depth associated with a field of view. The target volume can also be dynamically varied, for example, according to a position of the portal.

In another embodiment, a portal security system can include (i) a 3D imaging system that limits a field of view about a portal and generates a target volume from plural 2D images of the limited field of view, and (ii) a processor that detects and tracks people candidates moving through the target volume to detect a portal access event.

In another embodiment, a portal security system can include (i) a 3D imaging system that generates an entry target volume and an exit target volume, and (ii) a processor that detects and tracks people candidates moving through the entry target volume and the exit target volume to detect a portal access event. The entry target volume can be generated from plural 2D images of a field of view about an entry of a portal, while the exit target volume can be generated from plural 2D images of a field of view about an exit of the portal.

For coarse detection of people candidates within a target volume, a particular embodiment can include (i) generating a low resolution representation having a topological profile of the target volume; (ii) identifying a location of a peak within the low resolution representation; and converting the location of the peak into an approximate location of a people candidate in a high resolution representation of the target volume.

For fine detection of people candidates within a target volume, a particular embodiment can also include (i) generating a head template having dimensions corresponding to a height and an approximate location of a people candidate; and (ii) determining a fine location of the people candidate by matching the height of the people candidate to heights within an area of a representation of the target volume where the area corresponds to the dimensions of the head template.

For fine detection of people candidates within a target volume, a particular embodiment can further include (iii) determining a distribution of heights within the area corresponding to the dimensions of the head template and the fine location of the people candidate; and (iv) discarding the people candidate if the distribution of heights covers less than a height distribution for a head of a person.

For fine detection of people candidates within a target volume, a particular embodiment can further include (v) determining plural fine locations for plural people candidates; (vi) comparing the plural fine locations in three dimensional space; (vii) discarding at least one of the plural people candidates having a fine location that overlaps with another fine location of another people candidate.

For tracking of people candidates moving within a target volume, embodiments of the invention can include (i) generating confidence scores corresponding to numbers of people candidates being within the target volume; and (ii) detecting the portal access event from a series of the generated confidence scores.

For example, in particular embodiments, confidence scores are generated corresponding to at least one person being within the target volume by (i) generating a target volume in three dimensional space; (ii) generating individual scores for three dimensional points within the target volume, such that each of the individual scores corresponds to a height of one of the three dimensional points relative to a height threshold; (iii) generating a cumulative score from the individual scores; and (iv) computing a confidence score that corresponds to at least one person being within the target volume based on the cumulative score and a second threshold.

In another particular embodiment, confidence scores are generated corresponding to only one person being within the target volume by (i) generating a target volume in three dimensional space; (ii) removing a portion of the target volume that corresponds to one of the people candidates in the target volume; (iii) generating individual scores for three dimensional points remaining within the target volume, such that each of the individual scores corresponds to a height of one of the remaining three dimensional points relative to a height threshold; (iv) generating a cumulative score from the individual scores; and (v) computing a confidence score that corresponds to only one person being within the target volume based on the cumulative score and a second threshold.

In another particular embodiment, confidence scores are generated corresponding to two or more people being within the target volume based on a separation between head locations of the people candidates or based on a template score generated from matching head templates to head locations of the people candidates.

For tracking of people candidates moving within a target volume, embodiments of the invention can also include tracking trajectories of people candidates in order to weight the confidence scores, and in particular the confidence scores associated with two or more people being within a target volume.

In another particular embodiment, the portal security system can automatically calibrate a 3D coordinate system that corresponds to a 3D coordinate system of a portal scene.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention is directed at systems and methods of providing enhanced portal security through stereoscopy. A particular embodiment of the invention is a stereo door sensor that detects and optionally prevents access violations, such as piggybacking and tailgating. The stereo door sensor is a video based people sensor that generates three dimensional models from plural two dimensional images of a portal scene and further detects and tracks people candidates moving through a target volume within the model.

Figure 1A:
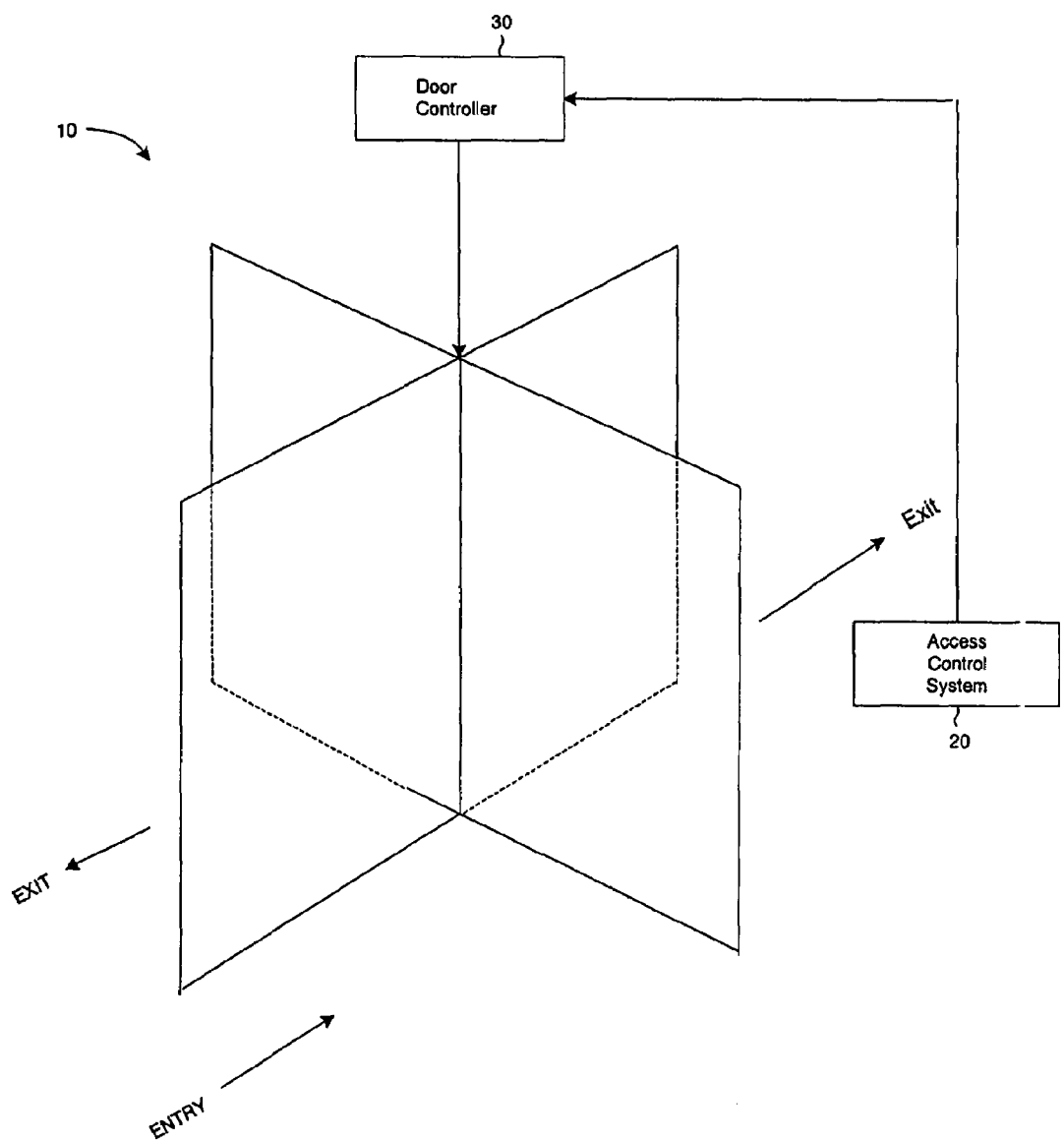
FIG. 1A is a block diagram of an access controlled revolving door according to the prior art.
Figure 1B:
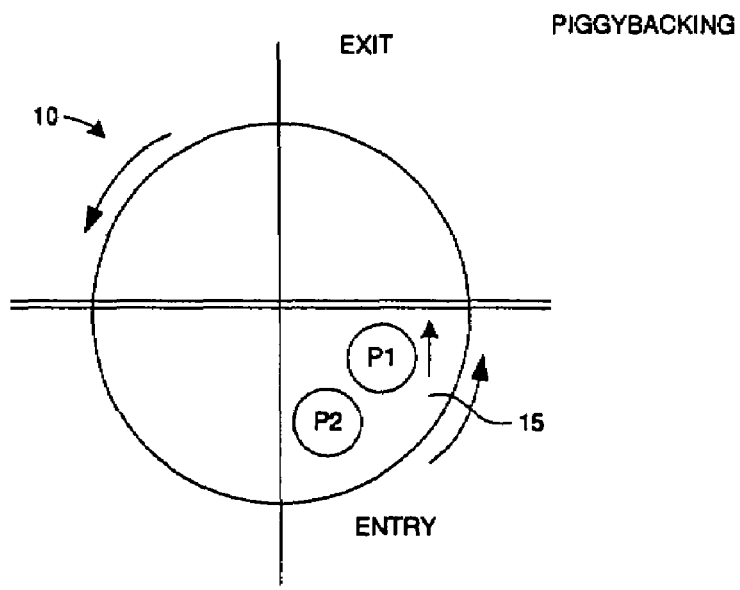
FIGS. 1B and 1C are top view diagrams of a revolving door for illustrating the concept of piggybacking.
Figure 1C:
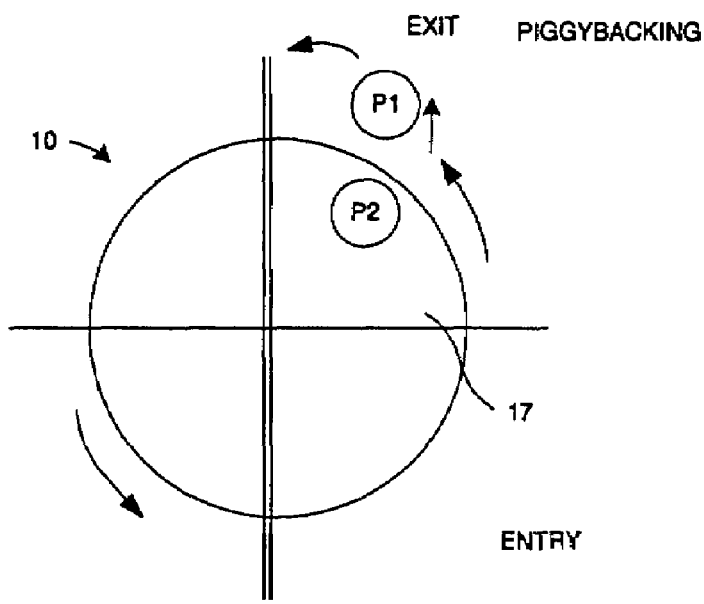
Figure 1D:
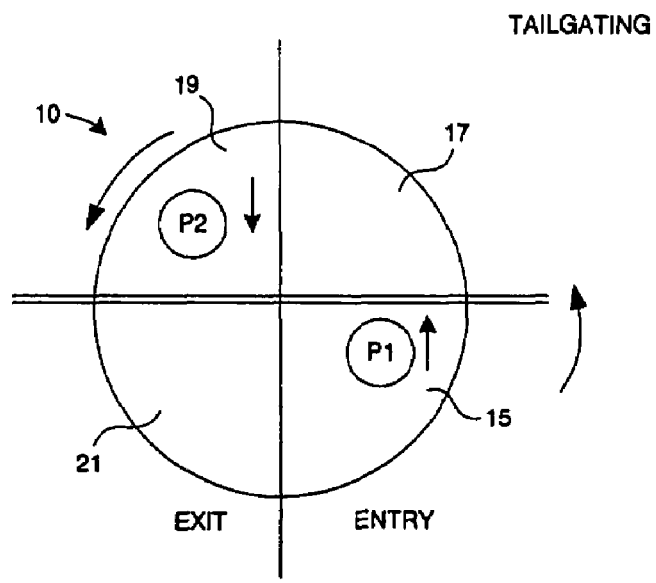
FIGS. 1D and 1E are top view diagrams of a revolving door for illustrating the concept of tailgating.
Figure 1E:
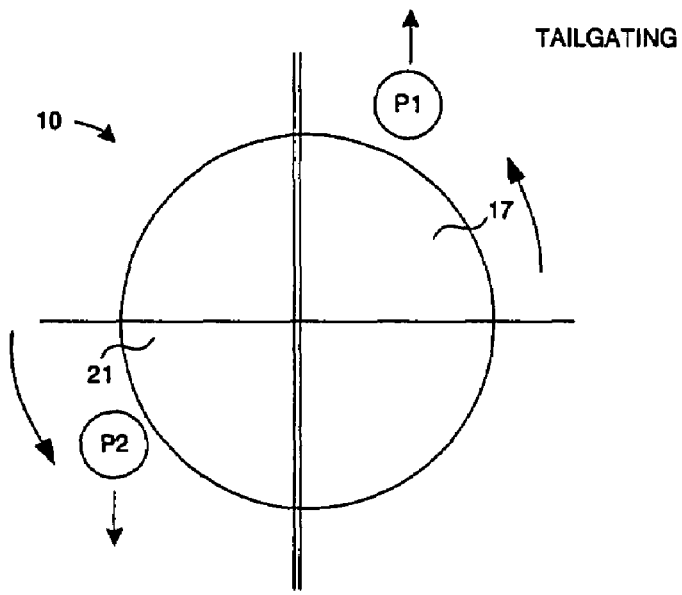
Figure 2A:
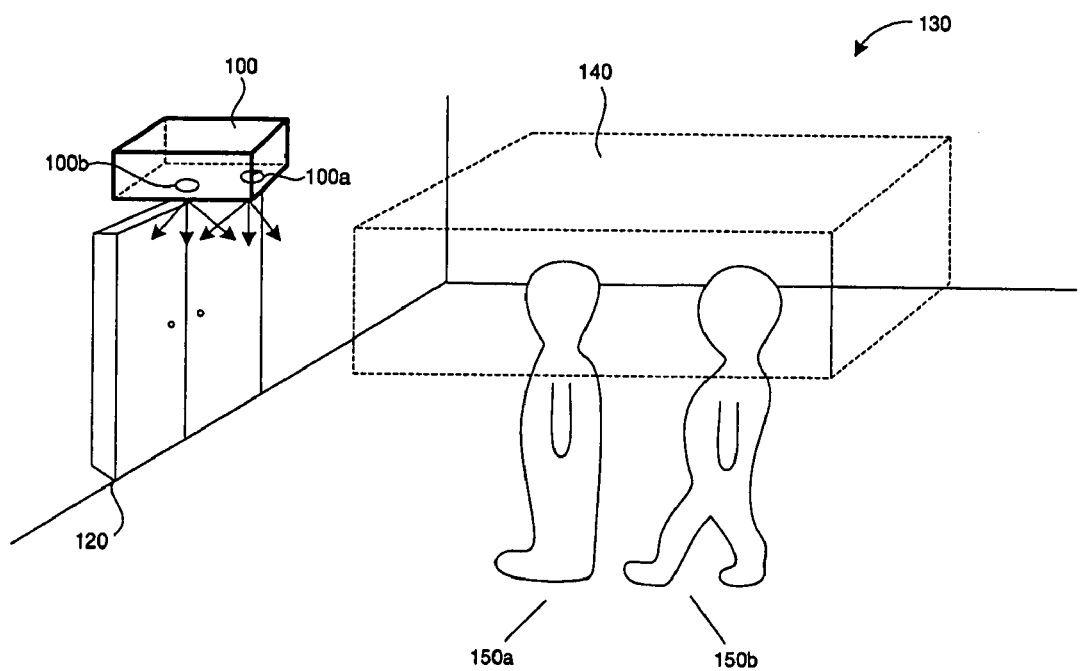
FIG. 2A is a perspective diagram of a stereo door sensor according to one embodiment.

FIG. 2A is a perspective diagram of a stereo door sensor according to one embodiment. In this example, the door 120 can be a sliding door or a swinging door. The sensor 100 is preferably positioned above a door 120 and includes at least two video cameras 110*a*, 110*b* for capturing two dimensional images of a door scene 130. The sensor is preferably mounted such that the baseline (i.e. line connecting the lens center of the two cameras 110*a*, 100*b*) is perpendicular to the door. This minimize occlusions, resulting in a greater chance that the points on the target are visible to both cameras. The sensor 100 can be mounted above the door in the header or on the ceiling adjacent to the door.

From the two dimensional images, the sensor 100 generates a three dimensional model of the scene 130 and then filters a target volume 140. People 150*a*, 150*b* moving through the target volume 140 are detected and tracked in order to detect access violations such as piggybacking and tailgating.

Figure 2B:
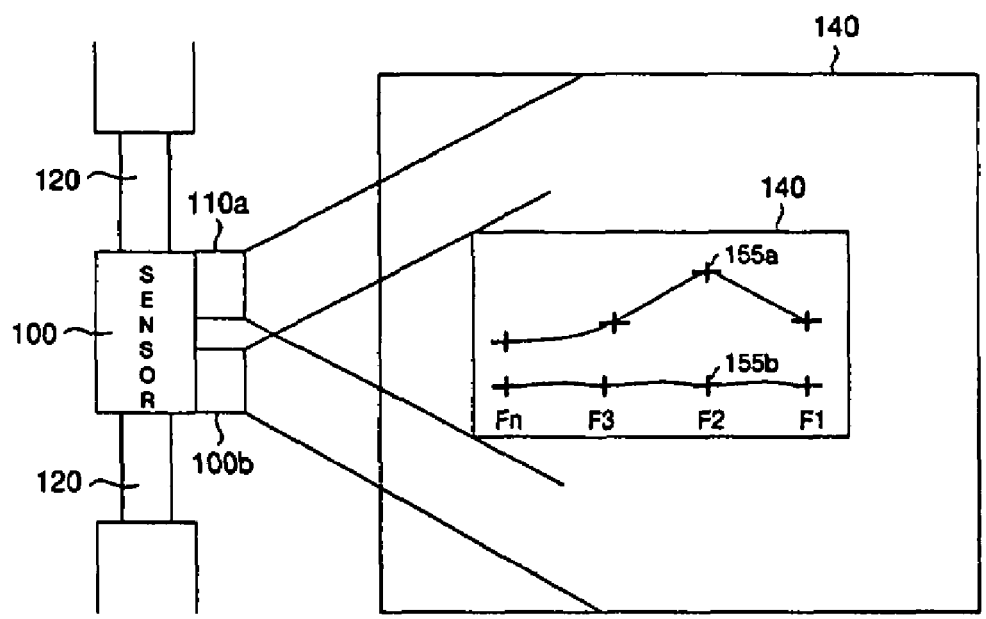
FIG. 2B is a block diagram illustrating a top view of a stereo door sensor according to the embodiment of FIG. 2A.

FIG. 2B is a block diagram illustrating a top view of a stereo door sensor according to the embodiment of FIG. 2A. In particular, the target volume 140 is preferably a subvolume of the three dimensional scene 130. For example, the target volume may exclude the floor and walls of an interior room and to avoid processing objects outside the area of interest. FIG. 2B further illustrates that people candidates are detected and tracked within a target volume 140 over a series of image frames Fn captured by stereo cameras 110*a*, 110*b*. For example, the sensor 100 tracks the movement of the people candidates by tracking head and shoulder positions 155*a*, 155*b* over a series of image frames Fn. By tracking the motion of people candidates, a more accurate determination of access violations can be made.

Figure 3:
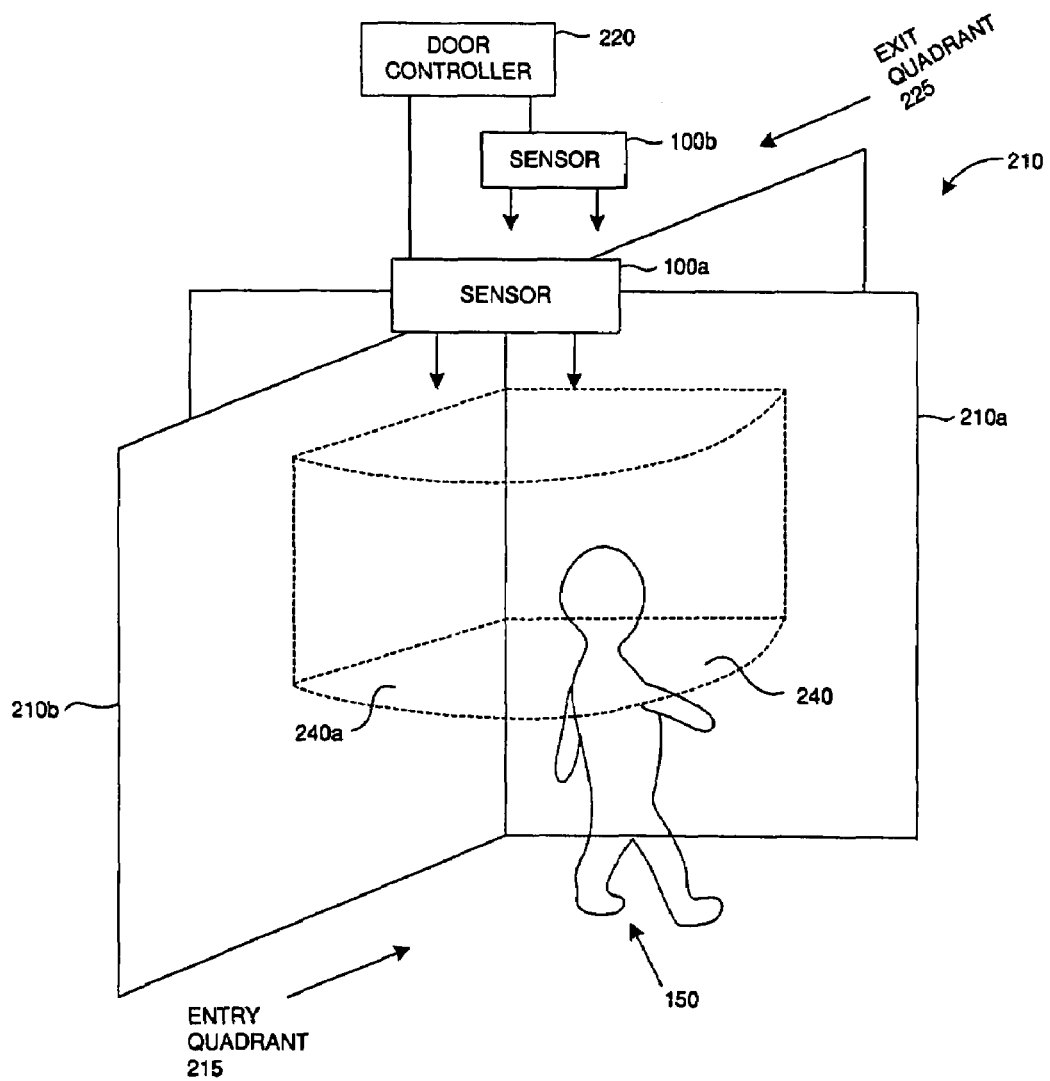
FIG. 3 is a block diagram illustrating an application of a stereo door sensor according to another embodiment.

FIG. 3 is a block diagram illustrating an application of a stereo door sensor according to another embodiment. In this example, the portal is a revolving door 210. Sensors 100*a* and 100*b* are positioned above the revolving door 210 with each independently monitoring a target volume within entry and exit quadrants 215, 225 respectively. For example, sensor 100*a* can be configured to monitor a target volume 240 having a pie-shaped volume hanging above the floor of entry quadrant 115. When the door 210 is in motion, the target volume 240 preferably rotates according to the position of the door 210.

Figure 4A:
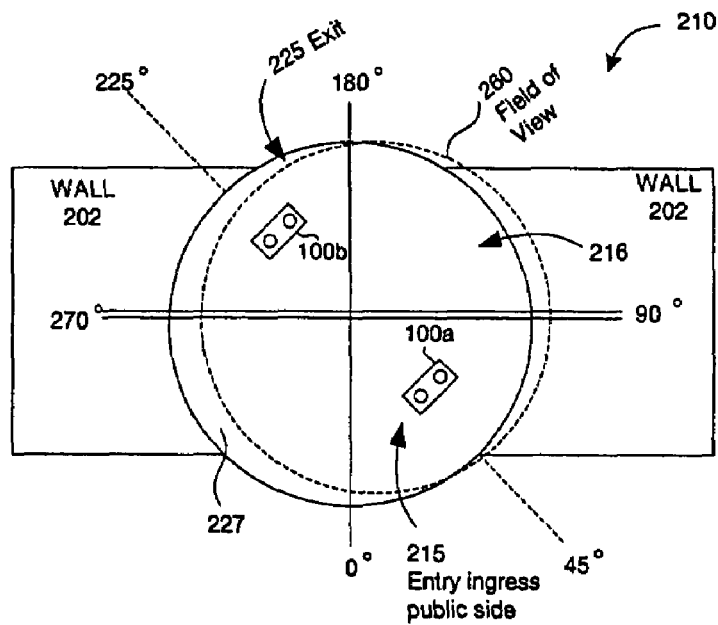
FIGS. 4A through 4C are top view diagrams of a revolving door illustrating a target volume being dynamically varied according to one embodiment.
Figure 4B:
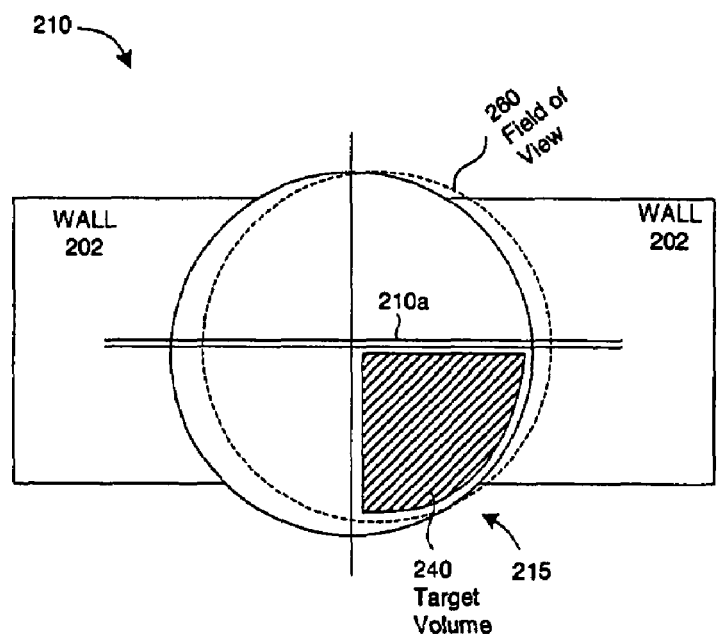
Figure 4C:
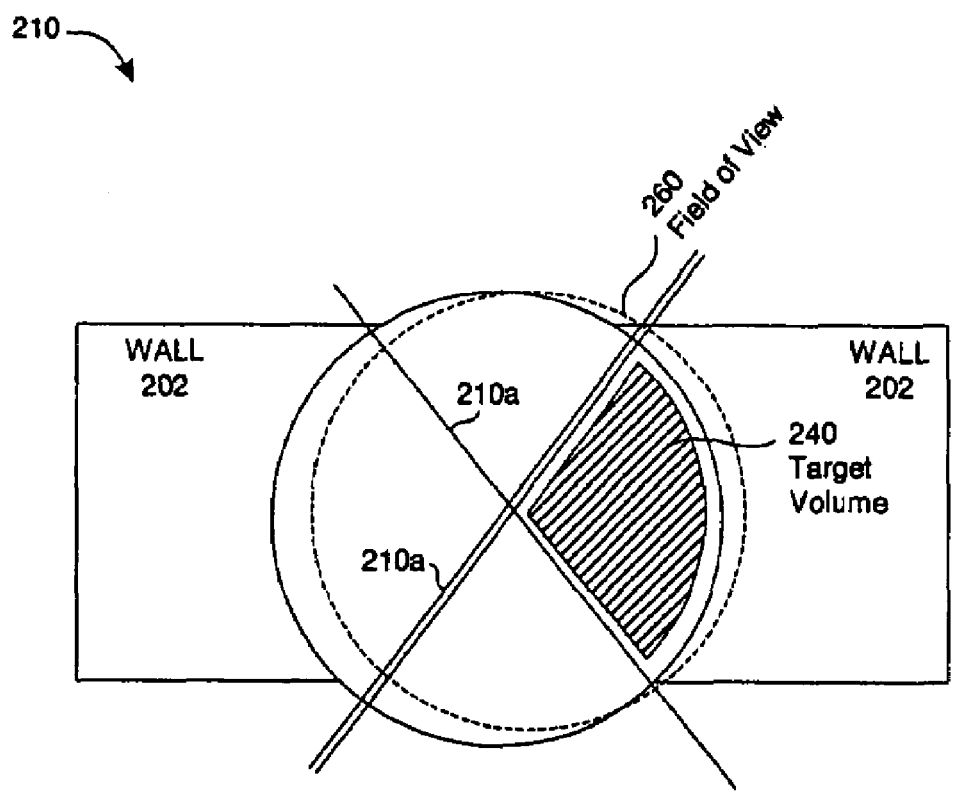

FIGS. 4A through 4C are top view diagrams of a revolving door illustrating a target volume being dynamically varied according to one embodiment. Referring to FIG. 4A, the entry leading quadrant corresponds to the angles 0-90 degrees, the entry trailing quadrant corresponds to 90-180 degrees, the exit leading quadrant corresponds to 180-270 degrees and the exit trailing quadrant corresponds to 270-360 degrees. The sensors 100*a*, 100*b* are spaced apart on opposite quadrants of the door 210 (i.e. the entry leading and exit leading quadrants). The sensors are preferably placed around the 45 degree and 225 degree diameter and oriented 90 degrees relative to the diameter. The stereo door sensors 100*a*, 100*b* can be positioned at standard ceiling heights of approximately 7 feet or more relative to the floor. The result of such positioning is that sensor 100*a* primarily monitors an ingress area also called the public side, while sensor 100*b* primarily monitors an egress area also called the secure side. The sensor preferably has a wide angular field of view in order to image tall people from 7 feet ceilings with minimal blind spots. Because the wings 210*a*, 210*b* of the revolving door typically include transparent window portions, the field of view 260 extends through the door as it rotates.

Referring to FIG. 4B, the sensor 100*a* (not shown) may have a two dimensional field of view 260 that encompasses a scene in which a substantial portion of the revolving door 210 is included. When the sensor 100*a* is initially installed, the target volume 240 is preferably configured to encompass a volume having an area corresponding to the interior of a door quadrant 215 that is defined by door wings 210*a*, 210*b*. Thus, in this example, the target volume 240 encompasses less than the full field of view 260.

In order to exclude the rotation of the door from the target volume 240, the sensor 100*a* can dynamically vary the target volume 240. As illustrated in FIG. 4C, the sensor can rotate the target volume 240 within the field of view 260 according to the door position defined by wings 210*a*, 210*b*. For example, in FIG. 4B, the door position is assumed to be at zero degrees with the target volume 240 encompassing the interior of entry quadrant 215. As the door rotates, the sensor continuously receives updates from the door 210 regarding door position and rotates the target volume accordingly. For example, in FIG. 4C, the door position as defined by wing 210*a* is at 45 degrees, resulting in the target volume 240 also being rotated by 45 degrees.

Figure 5:
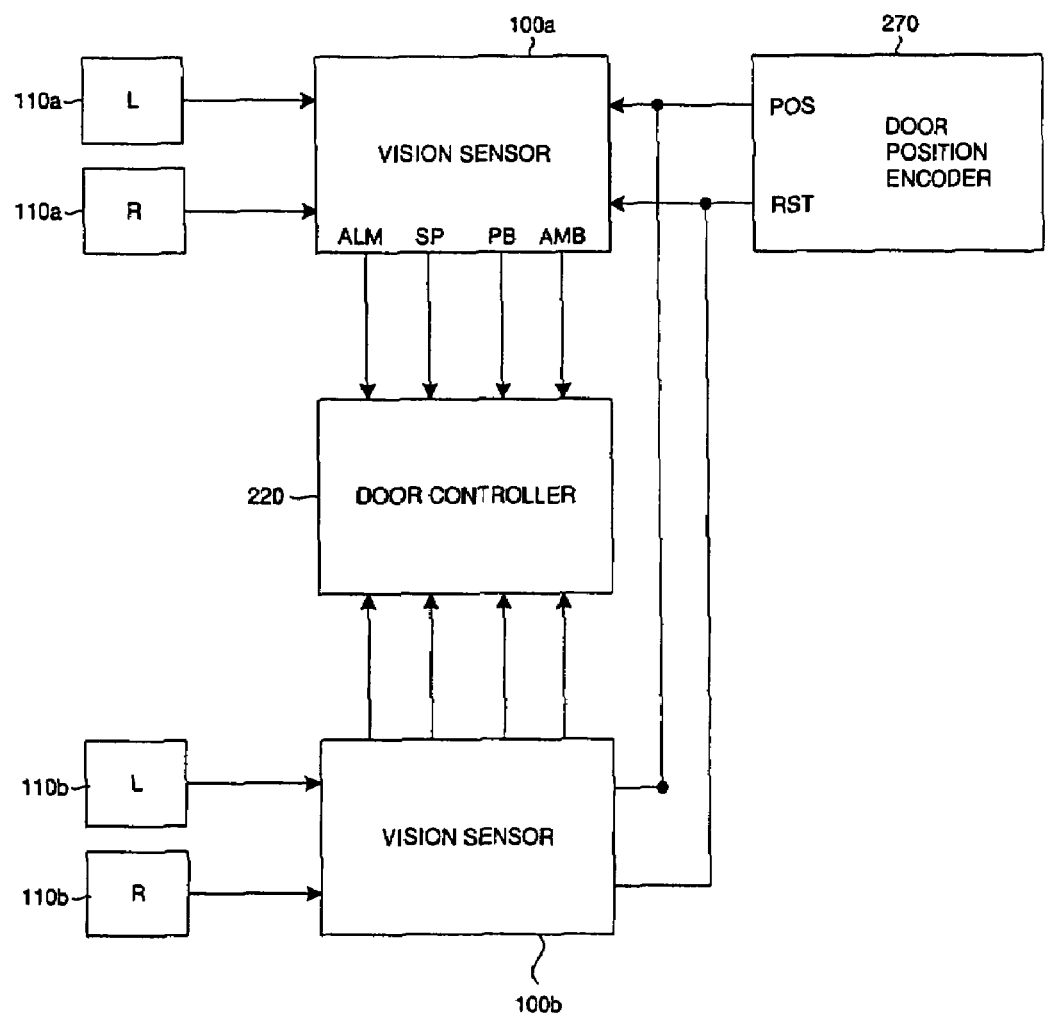
FIG. 5 is a block diagram illustrating a stereo door sensor system for a revolving door according to one embodiment.

FIG. 5 is a block diagram illustrating a stereo door sensor system for a revolving door according to one embodiment. In particular, the door controller 220 of a revolving door is coupled to sensors 100*a*, 100*b* (collectively 100). Each sensor 100 is coupled to cameras 110*a*, 110*b* that provide two dimensional images (e.g., left and right images) of a door scene. The sensors 100 are also coupled to a door position encoder 270, which encodes a door position for dynamically varying the target volumes corresponding to each sensor 100.

The sensors 100*a*, 100*b* can operate independently of one another providing event alerts to the door controller 220. The event alerts can be a piggyback event (PB), a single person event (SP), an ambiguous state event (AMB), and an alarm event (ALM).

In particular embodiments, these portal access events may not necessarily corresponds to access violations. In such embodiments, these events inform the door controller of the number of people detected within a target volume. For example, a piggyback event can corresponds to two or more people being detected within a target volume, while a single person event can corresponds to one person being detected with the target volume. Based on these events, the door controller can interface with an access controller system to determine whether an event also corresponds to an access violation. For example, if the sensor detects a piggyback event, the door controller can determine the number of validated accesses granted by the access controller. If only one validated accesses was granted, the piggyback event is also a violation.

In other embodiments, the portal access events may be used to indicate that a person is waiting for the door to activate (e.g., open, slide open, revolve, etc) and cause the door controller to activate the door.

If either sensor 100*a*, 100*b* detects a piggyback event, the sensor sends an alert to the door controller 220 to evoke a predetermined response. For example, with revolving doors, the door controller 220 can either stall the door to trap the passengers inside or reverse the direction of the revolving door to eject its passengers in the direction from which they came. The sensor may also generate a buffered video of the event or cause an audible alarm.

A single person event occurs when one and only person is detected and tracked within the target volume. If both sensors 100*a*, 100*b* detect a single person event, alerts are sent to the door controller 220. A tailgating event occurs if the door controller received notification of a single validated access from the access control system 20, and may result in the door controller causing the door to trap or eject the passengers as in the piggyback event.

If a sensor 100*a*, 100*b* cannot determine whether a single person event or a piggy back event is in progress, the sensor can also send an alert indicating an ambiguous state (AMB). The ambiguous state alert notifies the door controller 220 that there is a probability that a piggybacking event is in progress which is not definitive. The door controller 220 can be configured to ignore the ambiguous state or treat the state as a piggyback event. Thus, the handling of the ambiguous state is a compromise between security and traffic flow. In another embodiment, the ambiguous state may be treated separately causing, for example, a buffered video of the ambiguous event to be recorded for evaluation.

The sensors 100a, 100b can also transmit an alarm (ALM), for example, in response to camera failures, inadequate lighting conditions, or other error conditions.

Figure 6:
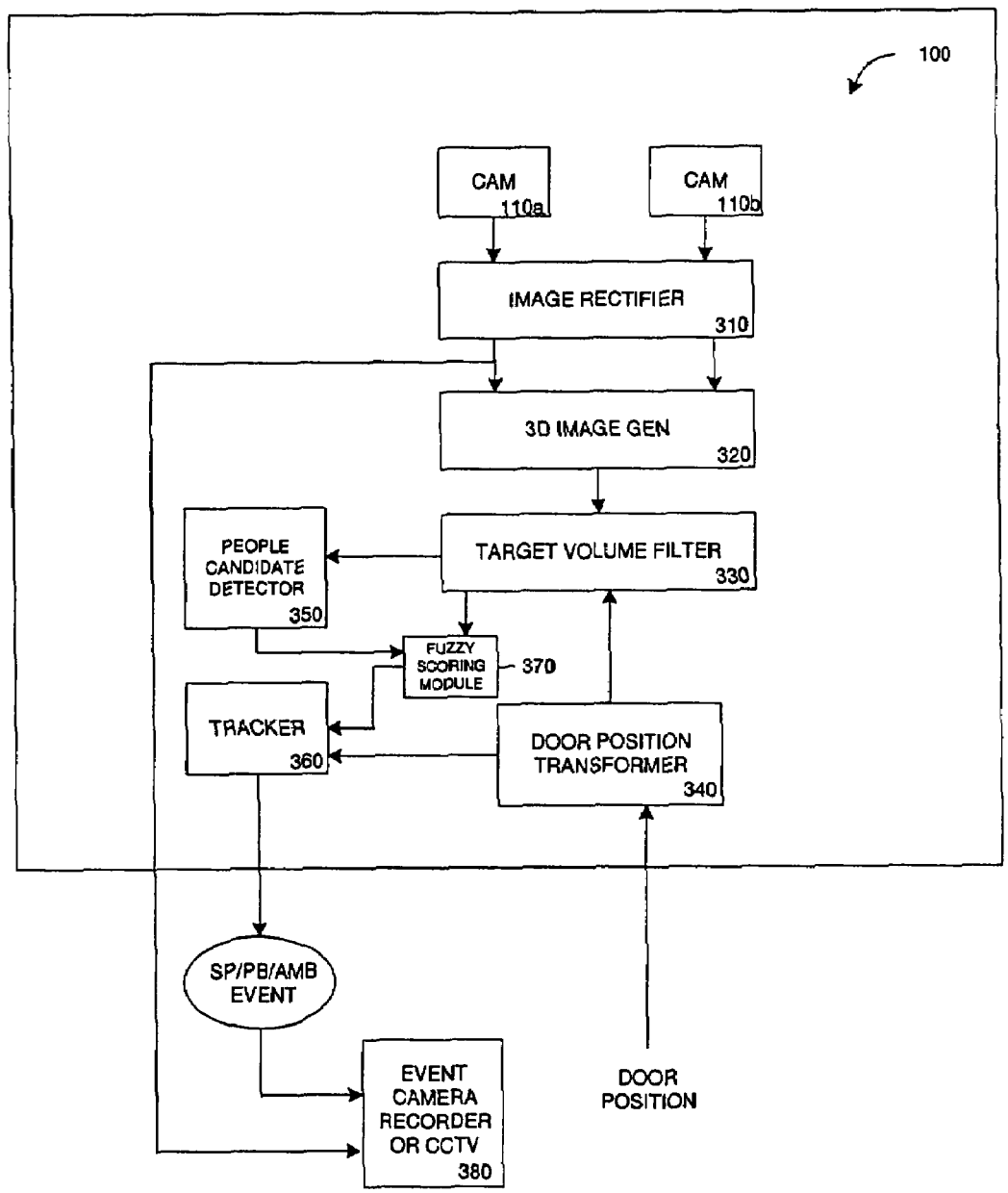
FIG. 6 is a schematic diagram illustrating the components of a stereo door sensor according to one embodiment.

FIG. 6 is a schematic diagram illustrating the components of a stereo door sensor according to one embodiment.

The sensor 100 includes at least two video cameras 110a, 110b that provide two dimensional images of a scene. The cameras 110a, 110b are positioned such that their lenses are aimed in substantially the same direction.

The sensor 100 preferably includes an image rectifier 310. Ideally, the image planes of the cameras 110a, 110b are coplanar such that a common scene point can be located in a common row, or epipolar line, in both image planes. However, due to differences in camera alignment and lens distortion, the image planes are not ideally coplanar. The image rectifier 310 transforms captured images into rectified coplanar images in order to obtain a virtually ideal image planes. The use of image rectification transforms are well known in the art for coplanar alignment of camera images for stereoscopy applications. Calibration of the image rectification transform is preferably performed during assembly of the sensor.

For information on camera calibration, refer to R. Y. Tsai, "A versatile camera calibration technique for high-accuracy 3D machine vision metrology using off-the-shelf TV cameras and lenses," *IEEE J Robotics and Automation*, vol. 3, no. 4, pp. 323-344 (hereinafter the "Tsai publication"), the entire contents of which are incorporated herein by reference. Also, refer to Z. Zhang, "A Flexible New Technique for Camera Calibration," *Technical Report MSR-TR*-98-71, MICROSOFT Research, MICROSOFT CORPORATION, pp 1-22 (Mar. 25, 1999) (hereinafter the "Zhang publication"), the entire contents of which are incorporated herein by reference.

A three dimensional (3D) image generator 320 generates 3D models of scenes surrounding a door from pairs of rectified images. In particular, the 3D image generator 320 can generate a three dimensional model in 3D world coordinates such that the model accurately represents the image points in a real 3D space.

A target volume filter 330 receives a 3D model of a door scene and clips all 3D image points outside the target volume. The target volume can be a fixed volume or dynamically variable volume. According to one embodiment, the dynamic target volume depends on a door position, or angle. The door position, or angle, is received by a door position transform 340 that converts the encoder value into a door position (angle) value. This angle value is provided to the target volume filter 330, which rotates the target volume by the phase value. According to another embodiment, the target volume is static volume and an identity transform can be used in place of the door position transform. Any image points within the 3D model that fall within the target volume are forwarded to a people candidate detector 350.

In an another embodiment, the filter 330 may receive the rectified 2D images of the field of view, clip the images so as to limit the field of view, and then the clipped images to the 3D image generator 320 to generate a 3D model that corresponds directly to a target volume.

The people candidate detector 350 can perform multi-resolution 3D processing such that each 3D image point within the target volume is initially processed at low resolution to determine a potential set of people candidates. From that set of people candidates, further processing of the corresponding 3D image points are performed at higher resolution to confirm the initial set of people candidates within the target volume. Some of the candidates identified during low resolution processing may be discarded during high resolution processing. The positions of the confirmed candidates are then forwarded to a scoring module 370 which updates the people candidates with fuzzy set membership scores, also referred to as confidence scores. These sets can include confidence scores F0, F1, and F2.

Confidence score F0 is a value between 0 and 1, for example, indicating a confidence level that there is something in the target volume. Confidence score F1 is a value between 0 and 1, for example, indicating a confidence level that there is only one person in the target volume. Confidence score F2 is a value between 0 and 1, for example, indicating a confidence level that there is more than one person in the target volume. Once the people candidates are updated with the fuzzy scores, the people candidates are passed on to a people candidate tracker 360.

Based on motion traces of the people candidates over time, the people candidate tracker 360 determines whether to send an alert indicating a single person event (SP) or a piggyback event (PB) or an ambiguous event (AMB).

In the case of revolving doors, the people candidate tracker 360 is coupled to the door position transformer 340. By providing a angle value corresponding to a door position, the tracker provides an alert before the revolving door reaches its X-position as in FIG. 4C, enabling the door controller to employ preventative action before the passengers exit the door.

The sensor 100 can be further coupled to an event camera recorder or closed circuit television 380 that receives a series of rectified image frames from image rectifier 310. The rectified images are provided by one of the cameras 110a, 110b that is designated a reference camera. The event camera recorder 380 can record short segments of video which it can save in response to receiving an alert from the people candidate tracker 360.

Figure 7A:
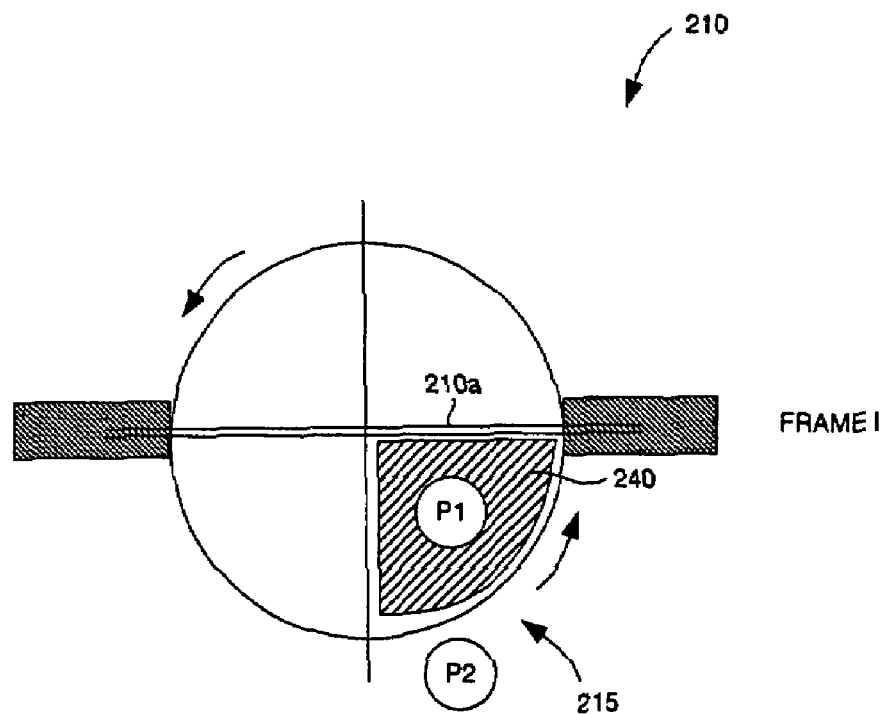
FIGS. 7A and 7B are top view diagrams of a revolving door for illustrating detection and prevention of piggyback events according to one embodiment.
Figure 7B:
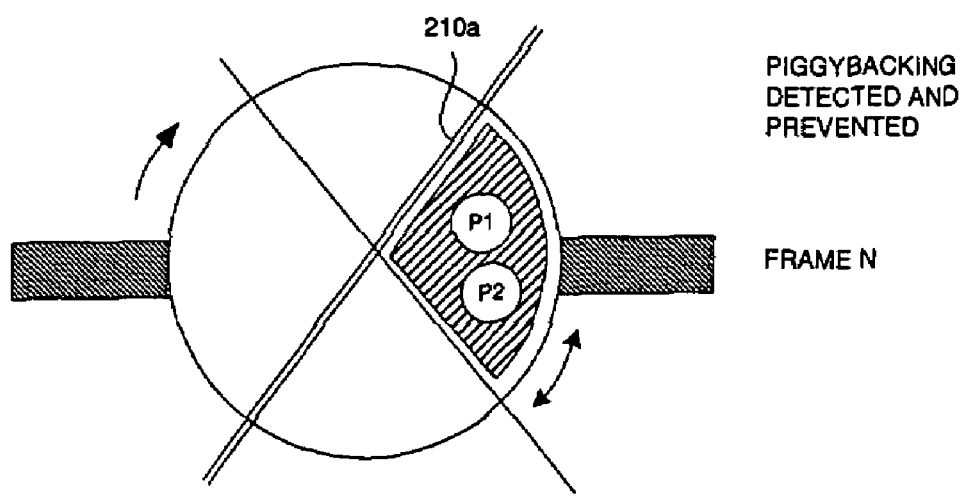

FIGS. 7A and 7B are top view diagrams of a revolving door for illustrating detection and prevention of piggyback events according to one embodiment. In this example, FIG. 7A shows an authorized person P1 stepping into the entry quadrant 215. A target volume 240 of the entry quadrant 215 is monitored by a stereo door sensor (not shown). As the doors begin to move, an unauthorized person P2 also steps into the entry quadrant 215 along with person P1. The stereo door sensor monitors the target volume 240 over a series of image frame N as the volume dynamically rotates according to the door position as in FIG. 7B. The stereo door sensor then alerts the door controller of the piggyback event just prior to the door rotating into its X position, such that responsive action may be taken before persons P1 and P2 exit the door.

Figure 8A:
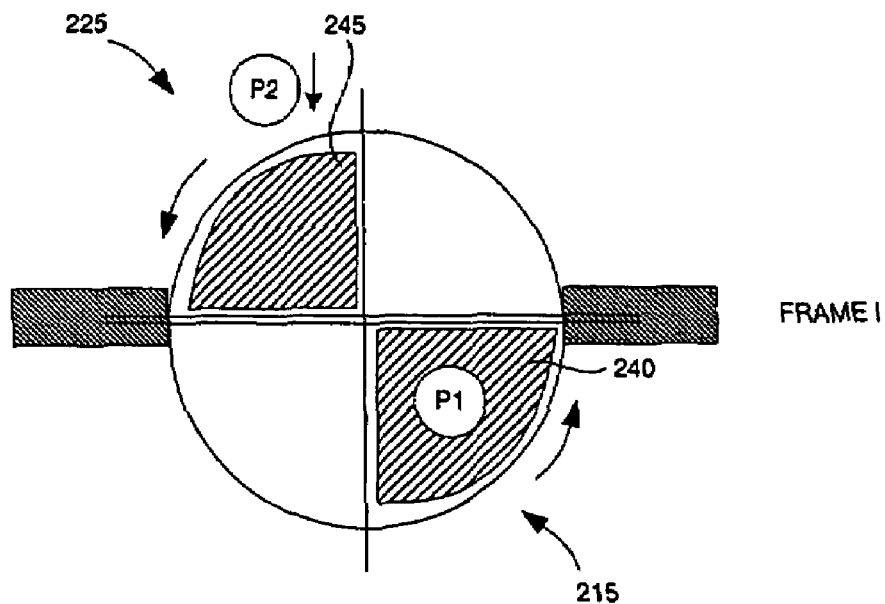
FIGS. 8A and 8B are top view diagrams of a revolving door for illustrating detection and prevention of tailgating according to one embodiment.
Figure 8B:
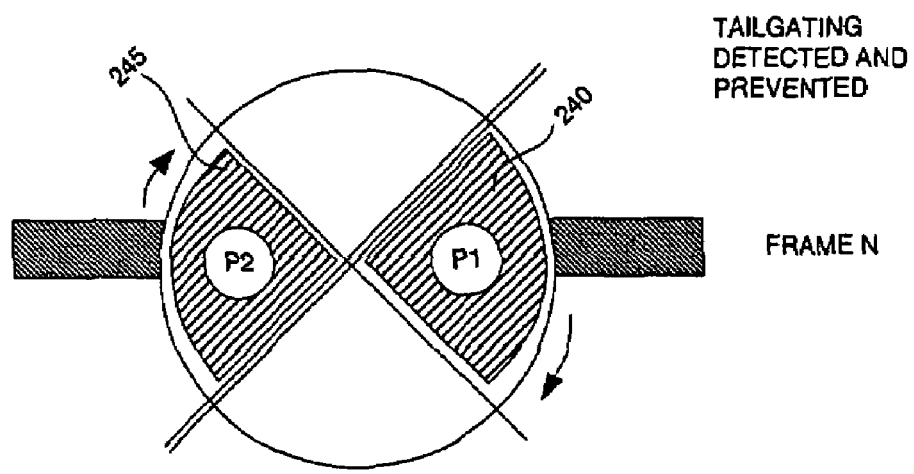

FIGS. 8A and 8B are top view diagrams of a revolving door for illustrating detection and prevention of tailgating according to one embodiment. In this example, FIG. 8A shows an unauthorized person P2 stepping into quadrant 225 at roughly the same time as an authorized person P1 steps into quadrant 215. Target volumes 240, 245 are monitored by stereo door sensors (not shown). As the doors begin to move, the stereo door sensors monitor the target volumes 240, 245 over a series of image frames N as they dynamically rotate according to door position as in FIG. 8B. The stereo door sensors each alert the door controller of a single person event just prior to the door rotating into its X position. In response to receive a single person event from both sensors, the door controller recognizes the tailgating event and takes responsive action before persons P1 and P2 exit the door.

Field Calibration of 3D World Coordinate System

In order to generate the three dimensional models from the captured two dimensional images, a 3D coordinate system in world coordinates is preferred. With a 3D world coordinate system, objects are transformed in a space relative to the door instead of the camera.

Figure 9:
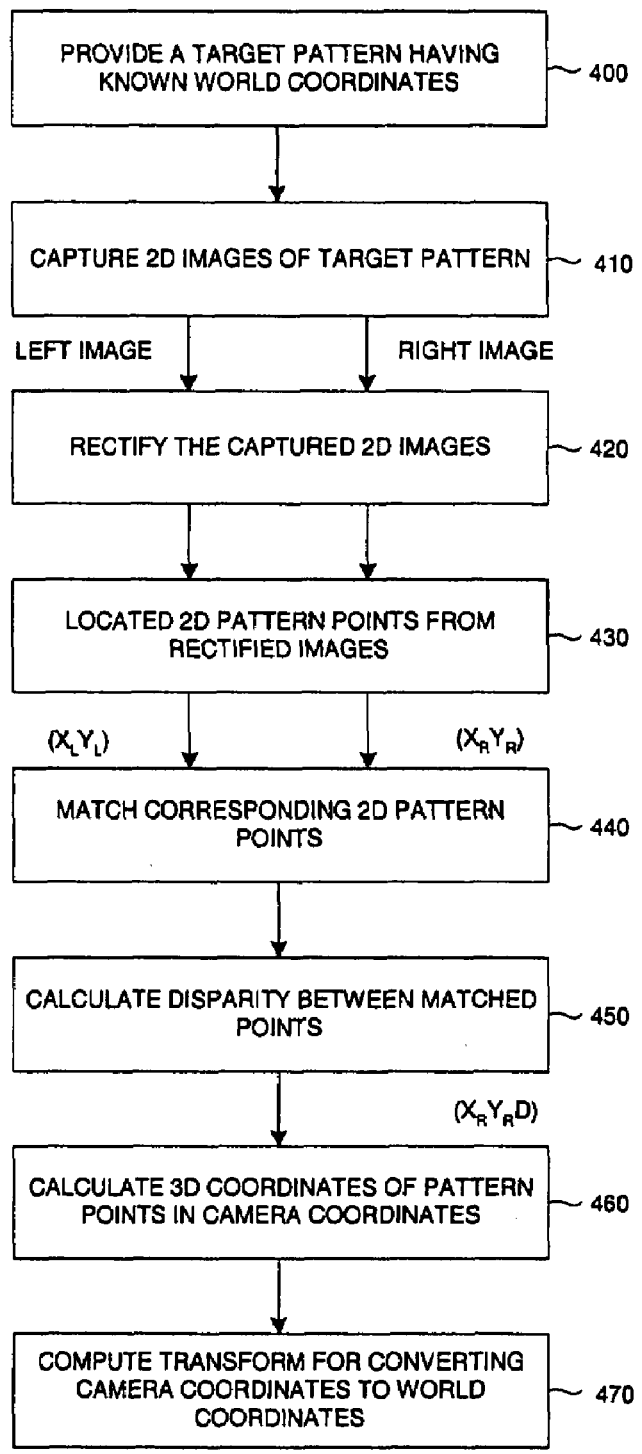
FIG. 9 is a flow diagram illustrating a process for calibrating a three dimensional world coordinate system according to one embodiment.

FIG. 9 is a flow diagram illustrating a process for calibrating a three dimensional world coordinate system according to one embodiment.

At 400, a target pattern is provided on the floor below the stereo door sensor. The target pattern includes patterns (e.g., shapes) having points in known world coordinates ($x_{w1}$, $y_{w1}$, 0), ($x_{w2}$, $Y_{w2}$, 0), etc. Because the floor is assumed to be the ground plane, the world coordinates in the z direction are equal to zero (i.e., $Z_{w1}$=0; $Z_{w2}$=0). At 410, two dimensional images of the pattern are captured by cameras 110a, 110b.

At 420, the image rectifier applies an image rectification transform to the two dimensional images resulting in the rectified images being coplanar with respect to each other.

At 430, the patterns are located within each rectified image using a pattern matching tool, such as Patmax® geometric pattern matching tool from Cognex Corporation®. Two dimensional coordinates corresponding to the located patterns in each image are returned as coordinate vectors ($X_L Y_L$) and ($X_R Y_R$).

At 440, points in a reference image from a reference camera are matched to points in the other image. Either camera may serve as the reference camera (e.g., the right image camera). Through rectification, the images become coplanar relative to each other such that the rows of each image are aligned. Thus, when matching points in the reference image to points in the corresponding two dimensional image, the matching involves locating the corresponding image points in the same row, referred to as an epipolar line.

At 450, disparities are calculated between the matched points relative to the reference image. In this embodiment, a disparity corresponds to a shift in the x-direction between a point in the reference image and a matched point in the second image. The result is a disparity map ($X_R$, $Y_R$, D) where X, Y correspond to the 2D coordinates of the pattern points in the reference image and D corresponds to the computed disparities between the 2D images.

At 460, three dimensional coordinates are calculated in camera coordinates for each of the image points relative to the reference camera ($x_{c1}$, $y_{c1}$, $z_{c1}$), ($x_{c2}$, $y_{c2}$, $z_{c2}$), etc. In particular, the 3D camera coordinates for the pattern points are calculated based on the disparity map ($X_R$, $Y_R$, D) and the intrinsic parameters of the reference camera geometry (i.e., effective focal length, image center, radial distortion coefficients, and aspect ratio) based on known algorithms.

At 470, a coordinate conversion transform is computed for converting 3D camera coordinates into 3D world coordinates. For example, the transform may be computed by applying a least squares fitting that correlates the computed 3D camera coordinates of the target pattern (i.e., ($x_{c1}$, $y_{c1}$, $z_{C1}$), ($x_{c2}$, $y_{c2}$, $z_{c2}$), etc.) to the known world coordinates of the target pattern (i.e., ($x_{w1}$, $y_{w1}$, 0), ($x_{w2}$, $y_{w2}$, 0), etc). The effective result of such calibration is a transform that can convert three dimensional points in camera space to world space. Furthermore, because target volumes are preferably modeled in world space filtering occurs in a more straight forward manner.

Standard techniques that solve for extrinsic parameters will also solve the problem of field calibration if the disparities computed in the original embodiment are not accurate enough. For more information on such techniques, refer to the Tsai and Zhang publications previously cited and incorporated by reference.

Defining a Target Volume

Figure 10A:
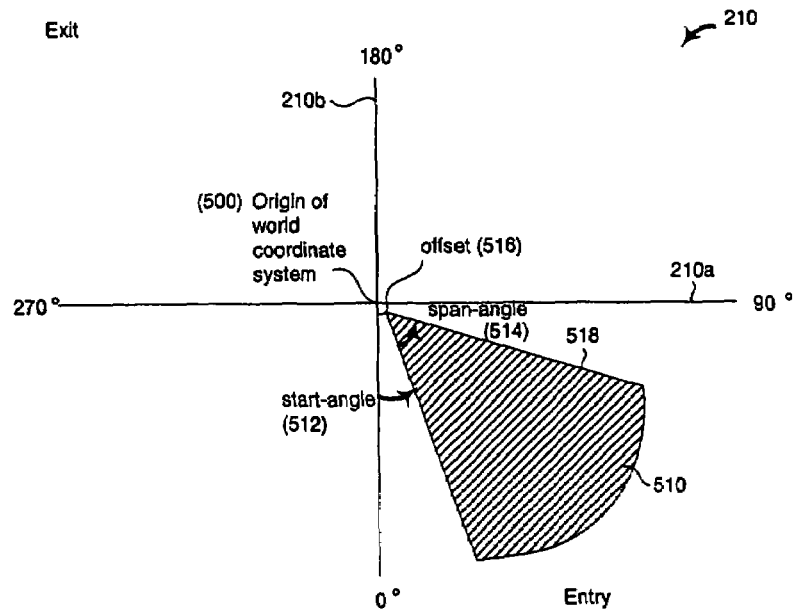
FIGS. 10A and 10B are block diagrams for illustrating the concept of defining target volumes according to particular embodiments.
Figure 10B:
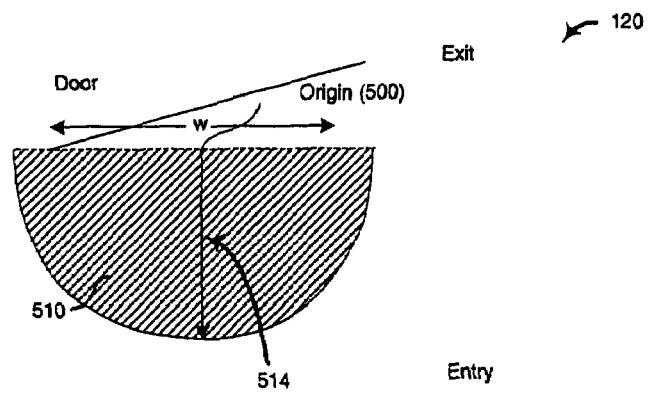

FIGS. 10A and 10B are block diagrams for illustrating the concept of defining target volumes according to particular embodiments. When the field installation is performed the door type (i.e. revolving door, swinging door, etc.) and the size of the door are known. Also, after the field calibration is done, the origin 500 is established in the world coordinate system. The origin 500 is preferably the center of the revolving door 210 as in FIG. 10A or the sliding/swinging door 120 as in FIG. 10B. It is now possible to define a static target volume completely in the established world coordinate system.

FIG. 10A is a top view of a revolving door illustrating a target volume according to one embodiment. For the revolving door 210, the target volume 510 is preferably defined when the door 210 is in a so-called "plus-position." In the plus-position, the wings 210a, 210b of the revolving door are along 0, 90, 180 and 270 degrees.

A top view of the target volume 510 is shown defined for the entry sensor 100a (not shown). In this example, the target volume 510 has a pie-type shape defined within a start angle 512 and a span angle 514. The target volume includes an offset 516 from the center 500 of the door 210 and a radius 518 which is dependent on the door diameter. The third dimension of the target volume 510 is the depth and starts, for example, about from a few inches off from the camera to about 28 inches off the floor.

In the case of revolving door, a dynamic target volume is preferably computed. According to one embodiment, the target volume is dynamically computed by approximating the top-view 2D shapes (pie and semicircle) by a polygon and transforming the points of the polygon by a 2D rotation transform whose angle corresponds to the door position. The heights of the points remain unaffected by the 2D rotation transform.

FIG. 10B is a top view of a swinging/sliding door illustrating a target volume according to another embodiment. Note that in the case of sliding doors, and most swinging doors, the target volume 510 generally remains static because the door 120 does not interfere in the field of view. If the door 120 does interfere in the field of view then the door angle has to be determined either by using an encoder or other techniques to compute a dynamic target volume. In the case of a sliding/swinging door, a single radius value 514 suffices to define the target volume in two dimensional space and the third dimension is akin to the revolving door target volume.

Portal Access Event Detection

Figure 11:
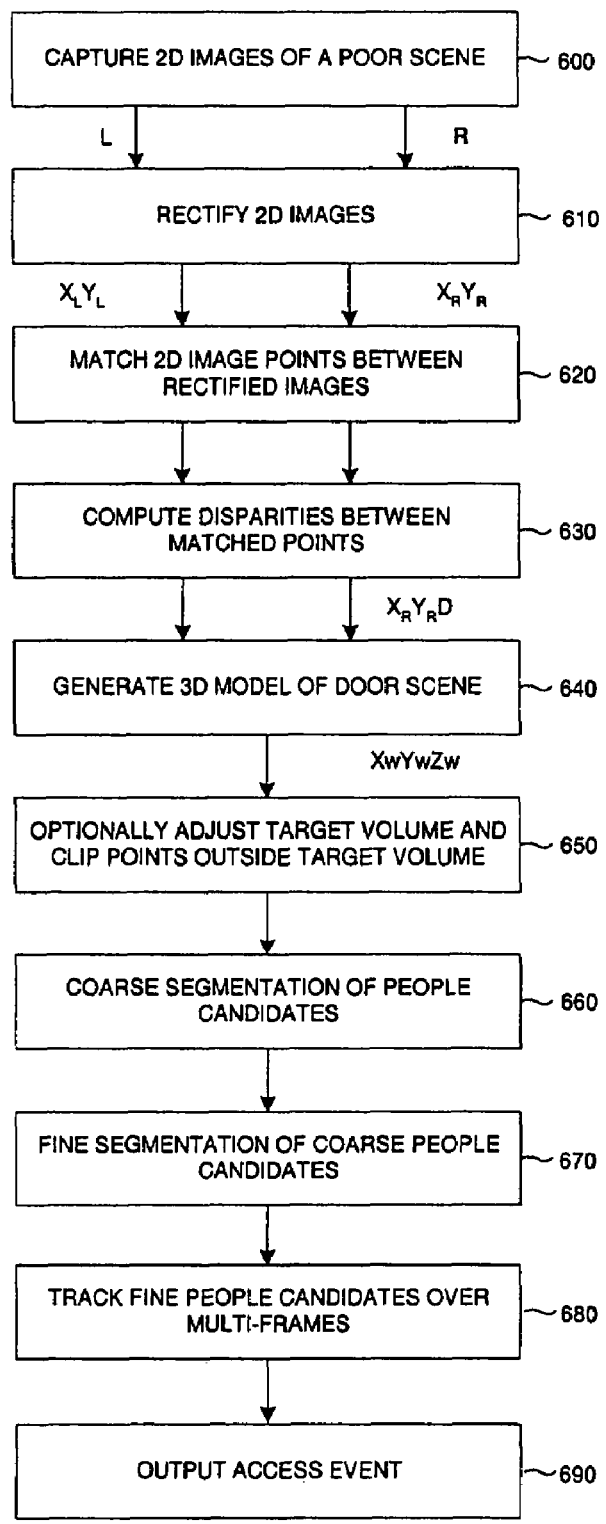
FIG. 11 is a flow diagram illustrating a process for detecting a portal access event according to one embodiment.

FIG. 11 is a flow diagram illustrating a process for detecting a portal access event according to one embodiment.

At 600, two dimensional images (e.g. right and left images) of a door scene are captured by cameras 110a, 110b. One of these cameras is designated the reference camera, and an image from the reference camera is the reference image.

At 610, the 2D images from cameras 110a, 110b are rectified by applying an image rectification transform that corrects for alignment and lens distortion, resulting in virtually coplanar images. Rectification can be performed by using standard image rectification transforms known in the art. In a preferred embodiment, the image rectification transform is implemented as a lookup table through which pixels of a raw image are transformed into pixels of a rectified image.

At 620, the 2D image points from the reference image ($X_R$, $Y_R$) are matched to corresponding 2D image points in the non-reference image ($X_L$, $Y_L$). By rectifying the images, reference image points ($X_R$, $Y_R$) are matched to non-reference image points ($X_L$, $Y_L$) along the same row, or epipolar line. Matching can be performed through known techniques in the art, such as in T. Kanade et al, "A Stereo Machine for Videorate Dense Depth Mapping and Its New Applications," Proc. IEEE Computer Vision and Pattern Recognition (CVPR), pp. 196-202, (1996), the entire contents of which are incorporated herein by reference.

At 630, a set of disparities D corresponding to the matched image points is computed relative to the reference image points ($X_R$, $Y_R$), resulting in a disparity map ($X_R$, $Y_R$, D), also called the depth map or the depth image. The disparity map contains a corresponding disparity 'd' for each reference image point ($X_R$, $Y_R$). By rectifying the images, each disparity 'd' corresponds to a shift in the x-direction.

At 640, a three dimensional model of the door scene is generated in 3D world coordinates. In one embodiment, the three dimensional scene is first generated in 3D camera coordinates ($X_C$, $Y_C$, $Z_C$) from the disparity map ($X_R$, $Y_R$, D) and intrinsic parameters of the reference camera geometry. The 3D camera coordinates ($X_C$, $Y_C$, $Z_C$) for each image point are then converted into 3D world coordinates ($X_W$, $Y_W$, $Z_W$) by applying the coordinate system transform described in FIG. 9.

At 650, the target volume can be dynamically adjusted and image points outside the target volume are clipped. For example, in the case of revolving doors, the target volume that was defined in FIG. 10A is rotated according to a door position. The 3D world coordinates of the door scene ($X_W$, $Y_W$, $Z_W$) that fall outside the 3D world coordinates of target volume are clipped. In a particular embodiment, clipping can be effectively performed by setting the disparity value 'd' to zero for each image points ($X_R$, $Y_R$) whose corresponding 3D world coordinates fall outside the target volume, resulting in a filtered disparity map "filtered ($X_R$, $Y_R$, D)". A disparity value that is equal to zero is considered invalid. The filtered disparity map is provided as input to a multi-resolution people segmentation process commencing at 660.

Figure 12A:
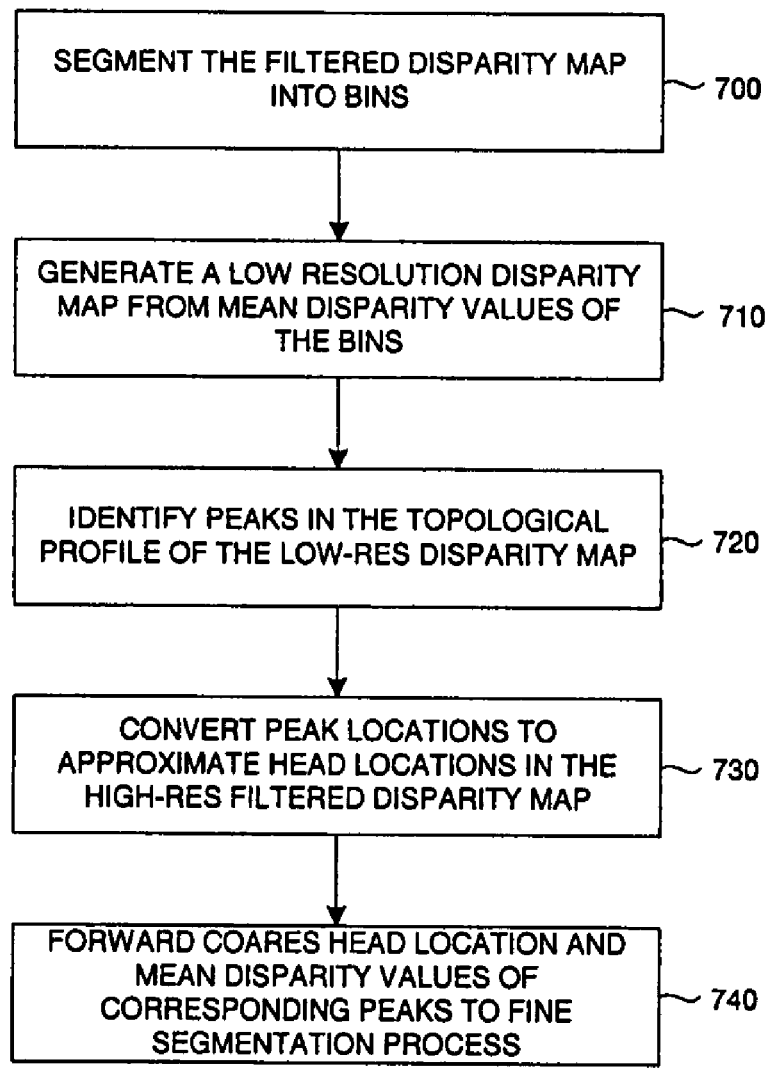
FIGS. 12A and 12B are diagrams illustrating a coarse segmentation process that identifies coarse people candidates according to one embodiment.
Figure 12B:
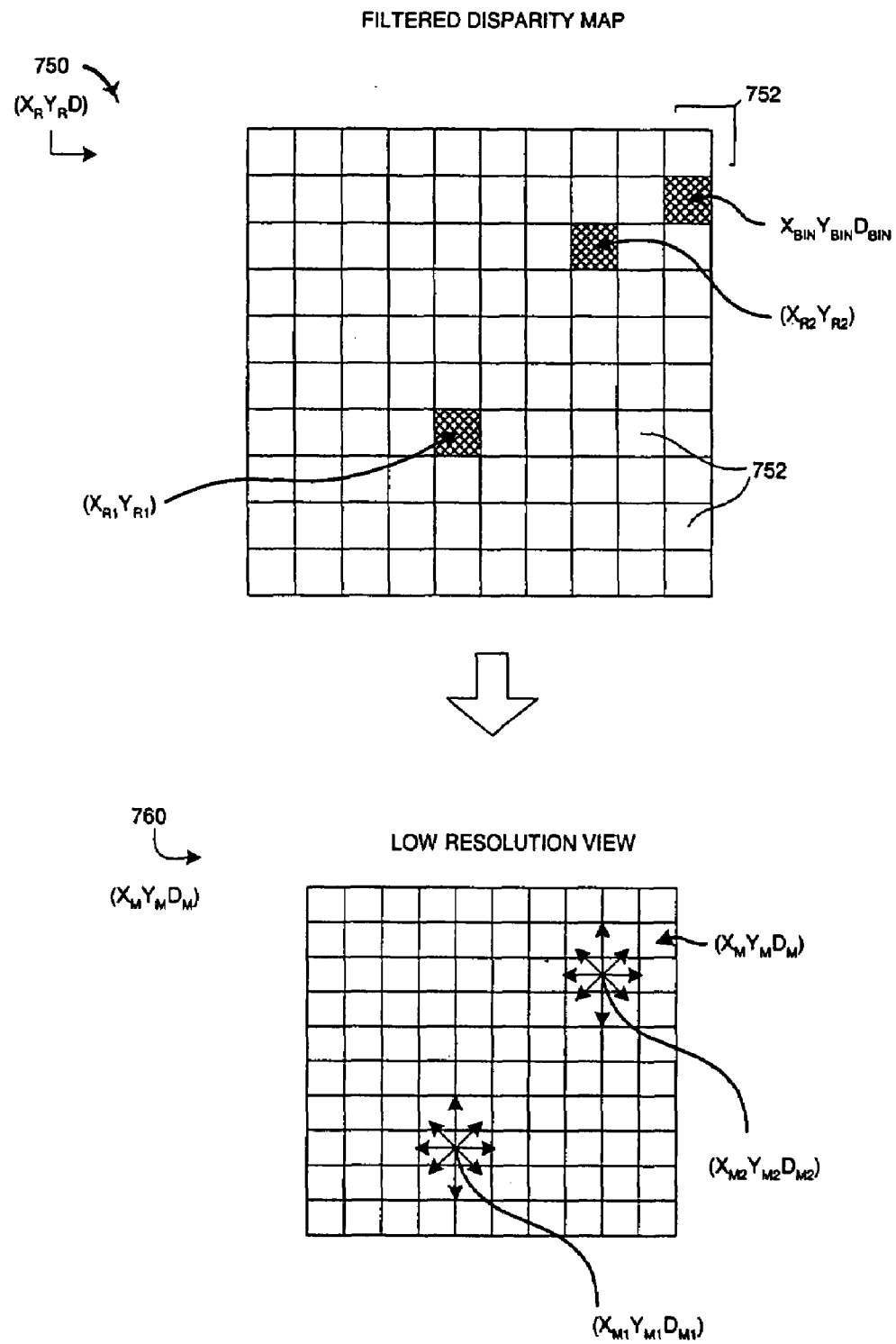

At 660, coarse segmentation is performed for identifying people candidates within the target volume. According to one embodiment, coarse segmentation includes generating a topological profile of the target volume from a low resolution view of the filtered disparity map. Peaks within the topological profile are identified as potential people candidates. A particular embodiment for performing coarse segmentation is illustrated in FIGS. 12A and 12B.

Figure 13A:
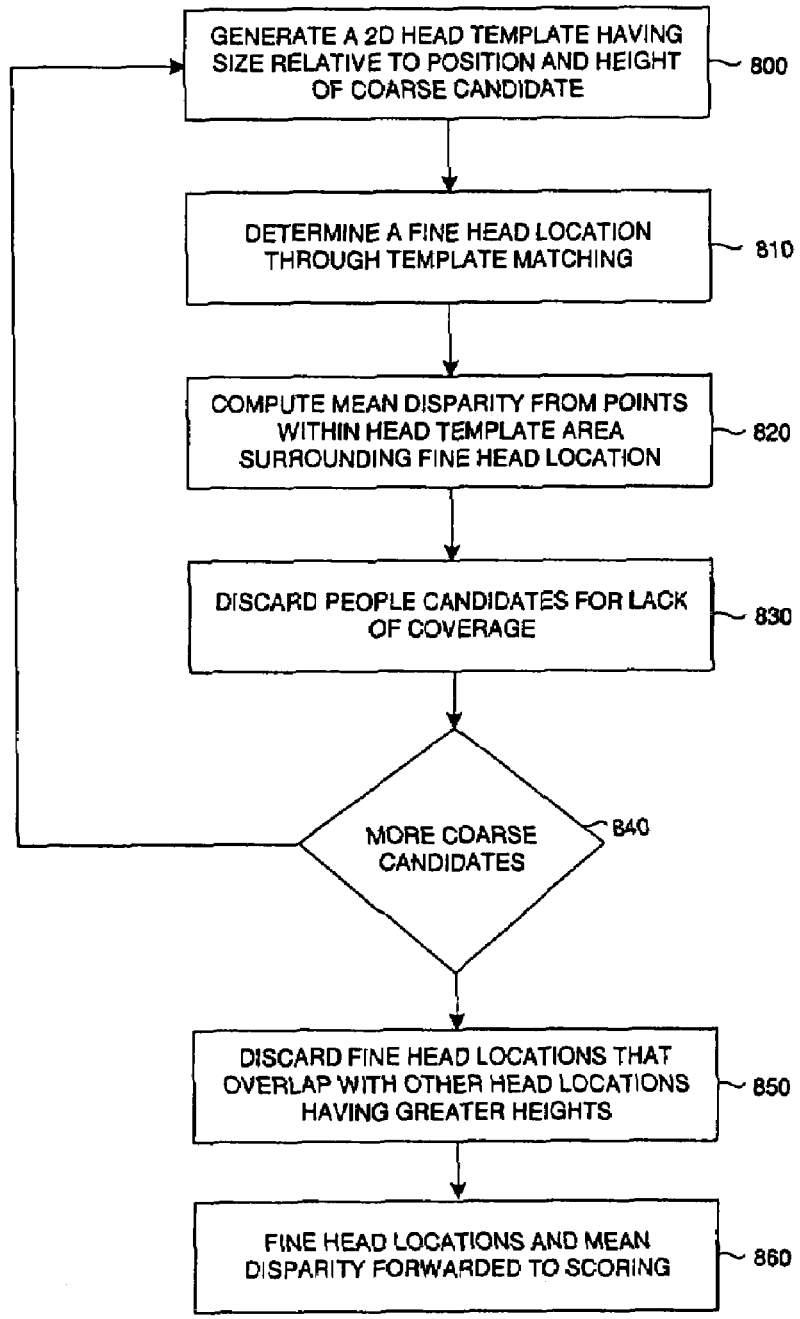
FIGS. 13A, 13B, and 13C are diagrams illustrating a fine segmentation process for validating or discarding coarse people candidates according to one embodiment.
Figure 13B:
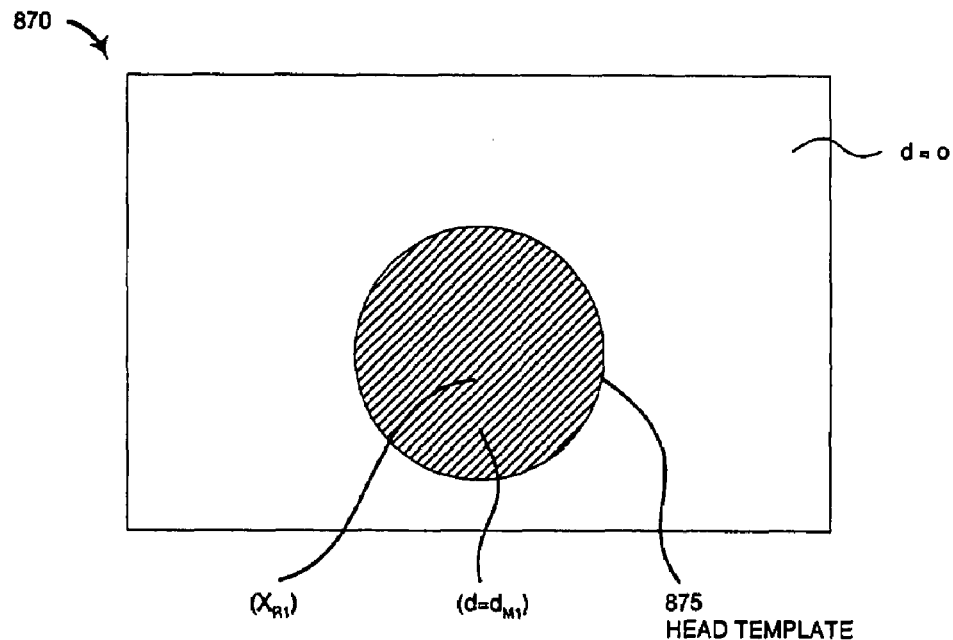
Figure 13C:
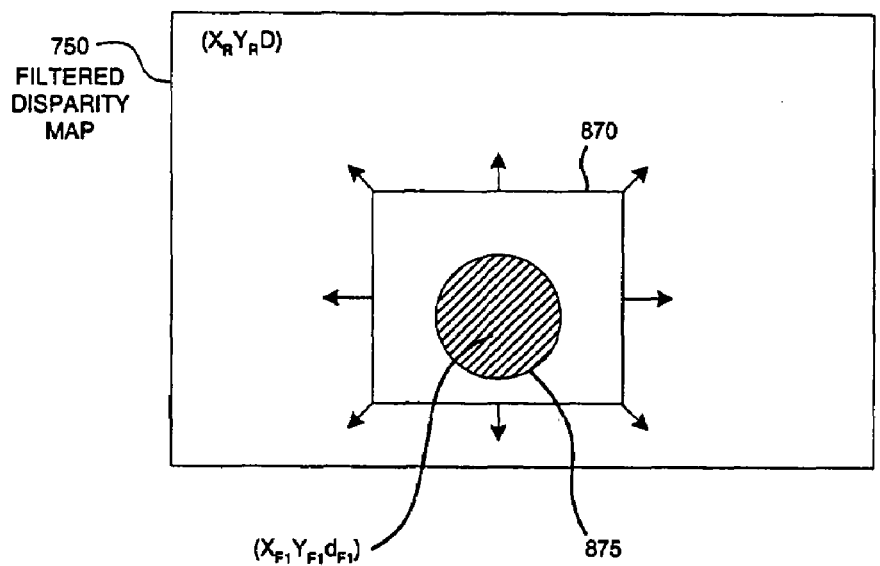

At 670, fine segmentation is performed for confirming or discarding people candidates identified during course segmentation. According to one embodiment, the filtered disparity map is analyzed within localized areas at full resolution. The localized areas correspond to the locations of the people candidates identified during the coarse segmentation process. In particular, the fine segmentation process attempts to detect head and shoulder profiles within three dimensional volumes generated from the localized areas of the disparity map. A particular embodiment for performing fine segmentation is illustrated in FIGS. 13A through 13C.

At 680, the validated people candidates are tracked across multiple frames to determine access events, such as a piggyback violation, a single person event, or an ambiguous event. For example, the validated people candidates can be tracked using a fuzzy/confidence level scoring algorithm over a series of video image frames as illustrated in FIGS. 14 through 17B. The people candidates may also be tracked according to a trajectory tracking algorithm as illustrated in FIGS. 18A through 18C.

At 690, the determined access event is output triggering response actions from the door system.

Coarse Segmentation of People Candidates

FIGS. 12A and 12B are diagrams illustrating a coarse segmentation process that identifies coarse people candidates according to one embodiment. In particular, FIG. 12A is a flow diagram illustrating a coarse segmentation process that identifies coarse people candidates according to one embodiment. The detected locations of the coarse people candidates resulting from the segmentation process are then forwarded to a fine segmentation process for validation or discard.

At 700, the filtered disparity map is segmented into bins. For example, in FIG. 12B, the filtered disparity map 750 includes points ($X_R$, $Y_R$, D) which are segmented into bins 752, such that each bin contains a set of image points ($X_{BIN}$, $Y_{BIN}$) and their corresponding disparities ($D_{BIN}$).

At 710 of FIG. 12A, a low resolution disparity map is generated from calculated mean disparity values of the bins. For example, in FIG. 12B, a low resolution disparity map 760 is generated including points ($X_M$, $Y_M$, $D_M$) where the points ($X_M$, $Y_M$) correspond to bin locations in the high resolution disparity map 750 and $D_M$ corresponds to the mean disparity values $d_M$ calculated from those bins.

In a particular embodiment, a mean disparity value $d_M$ for a particular bin can be calculated by generating a histogram of all of the disparities $D_{BIN}$ in the bin having points ($X_{BIN}$, $Y_{BIN}$). Excluding the bin points in which the disparities are equal to zero and thus invalid, a normalized mean disparity value $d_M$ is calculated. The normalized mean disparity $d_M$ is assigned to a point in the low resolution disparity map for that bin.

At 720 of FIG. 12A, peaks are identified in the topological profile of the low resolution disparity map. In a particular embodiment, a peak is identified at a location in the low resolution disparity map having the largest value for mean disparity value $d_M$. The extent of the peak is determined by traversing points in every direction, checking the disparity values at each point, and stopping in a direction when the disparity values start to rise. After determining the extent of the first peak, the process repeats for any remaining points in the low resolution map that have not been traversed.

For example, in FIG. 12B, peak locations are identified at ($x_{M1}$, $y_{M1}$) and ($x_{M2}$, $y_{m2}$) of the low resolution disparity map 760 having mean disparity values $d_{M1}$, $d_{M2}$. The arrows extending from the peak locations illustrate the paths traversed from the peak locations. A watershed algorithm can be implemented for performing the traversal routine.

At 730 of FIG. 12A, each of the peak locations are converted to approximate head location in the high resolution filtered disparity map. For example, in FIG. 12B, peak locations ($x_{M1}$, $y_{M1}$) and ($x_{M2}$, $y_{M2}$) in the low resolution disparity map 760 are converted into locations ($x_{R1}$, $y_{R1}$) and ($x_{R2}$, $y_{R2}$) in the high resolution disparity map 750. This conversion can be accomplished by multiplying the peak locations by the number and size of the bins in the corresponding x- or y-direction.

At 740 of FIG. 12A, the locations of the coarse people candidates (e.g., ($x_{R1}$, $y_{R1}$) and ($x_{R2}$, $y_{R2}$)) in the filtered disparity map and the mean disparity values $d_{M1}$, $d_{M2}$ of the corresponding peak locations are forwarded to a fine segmentation process for validating or discarding these locations as people candidates, as in FIG. 13A.

Fine Segmentation of People Candidates

FIGS. 13A, 13B, and 13C are diagrams illustrating a fine segmentation process for validating or discarding coarse people candidates according to one embodiment. In particular, FIG. 13A is a flow diagram illustrating fine segmentation process for validating or discarding coarse people candidates according to one embodiment. In particular, the fine segmentation process obtains more accurate, or fine, locations of the coarse people candidates in the filtered disparity map and then determines whether the coarse people candidates have the characteristic head/shoulder profiles from localized analysis of the high resolution filtered disparity map. Depending on the results, the fine segmentation process either validates or discards the people candidates.

At 800, a two dimensional head template is generated having a size relative to the disparity of one of the coarse candidates. Disparity corresponds indirectly to height such that as disparity increases, the distance from the camera decreases, and thus the height of the person increases. For example, FIG. 13B is a block diagram of an exemplary head template according to one embodiment. In the illustrated embodiment, the template model 870 includes a head template 875. The head template 875 is a circular model that corresponds to the top view of a head.

The dimensions of the head template 875 are based on the coarse location of the candidate (e.g., $x_{R1}$, $y_{R1}$), the mean disparity value (e.g., $d_{M1}$), and known dimensions of a standard head (e.g. 20 cm in diameter, 10 cm in radius). For example, to compute the dimensions of the head template, the position of the head is computed in 3D world coordinates (X, Y, Z) from the calculated coarse location and a mean disparity value using the factory data (e.g., intrinsic parameters of camera geometry) and field calibration data (e.g., camera to world coordinate system transform). Next, consider another point in the world coordinate system which is (X+10 cm, Y, Z) and compute the position of the point in the rectified image space (e.g., $x_{R2}$, $y_{R2}$) which is the image space in which all the image coordinates are maintained. The length of the vector defined by ($x_{R1}$, $y_{R1}$) and ($x_{R2}$, $y_{R2}$) corresponds to the radius of the circular model for the head template 875.

Furthermore, each point within the area of the resulting head template 875 is assigned the mean disparity value (e.g., $d_{M1}$) determined for that candidate. Points outside the head template 875 are assigned an invalid disparity value equal to zero.

At 810 of FIG. 13A, a fine location for the candidate is determined through template matching. For example, in the illustrated embodiment of FIG. 13C, the template model 870 overlays the filter disparity map 750 at an initial position corresponding to the coarse head location (e.g., $x_{R1}$, $y_{R1}$). The disparities of the filtered disparity map 750 that fall within the head template 875 are then subtracted from the mean disparity value for the coarse people candidate (e.g., $d_{M1}$). A sum of the absolute values of these differences is then computed as a template score that serves as a relative indication of whether the underlying points of the filtered disparity map correspond to a head. Other correlation techniques may also be implemented to generate the template score.

The template matching is repeated, for example, by positioning the template 870 to other areas such that the center of the head template 875 corresponds to locations about the original coarse location of the candidate (e.g., $x_{R1}$, $y_{R1}$). A fine location for the candidate ($x_{F1}$, $y_{F1}$) is obtained from the position of the head template 875 at which the best template score was obtained.

At 820, another mean disparity value $d_{F1}$ is computed from the points of the filtered disparity map within the head template 875 centered at the fine candidate location ($x_{F1}$, $y_{F1}$). In a particular embodiment, the mean disparity value $d_{F1}$ can be calculated by generating a histogram of all the disparities of the filtered disparity map that fall within the head template. Excluding the points in which the disparities are equal to zero and thus invalid, the normalized mean disparity value $d_{F1}$ is calculated.

At 830, people candidates are discarded for lack of coverage by analyzing the disparities that fall within the head template which is fixed at the fine head location. For example, it is known that disparity corresponds to the height of an object. Thus, a histogram of a person's head is expected to have a distribution, or coverage, of disparities that is centered at a particular disparity tapering downward. If the resulting histogram generated at 820 does not conform to such a distribution, it is likely that the candidate is not a person and the candidate is discarded for lack of coverage.

At 840, the process determines whether there are more coarse candidates to process. If so, the process returns to 800 to analyze the next candidate. Otherwise, the process continues at 850.

At 850, people candidates having head locations that overlap with head locations of other people candidates are discarded. In a particular embodiment, the head locations of all of the people candidates are converted from the filtered disparity map into their corresponding 3D world coordinates. People candidates whose head locations overlap with the head locations of other people candidates result in at least one of the candidates being discarded. Preferably, the candidate corresponding to a shorter head location is discarded, because the candidate likely corresponds to a neck, shoulder, or other object other than a person.

At 860, the one or more resulting fine head locations (e.g., $x_{F1}$, $y_{F1}$) of the validated people candidates and the corresponding mean disparity values (e.g., $d_{F1}$) are forwarded for further processing to determine portal access events, such as a piggyback violation or a single person event. For example, the validated people candidates can be tracked using a confidence level scoring algorithm over a series of video image frames as illustrated in FIGS. 14 through 17B. The people candidates may also be tracked according to a trajectory tracking algorithm as illustrated in FIGS. 18A and 18B.

Confidence Level Scoring of the Fuzzy Scoring Module

Figure 14:
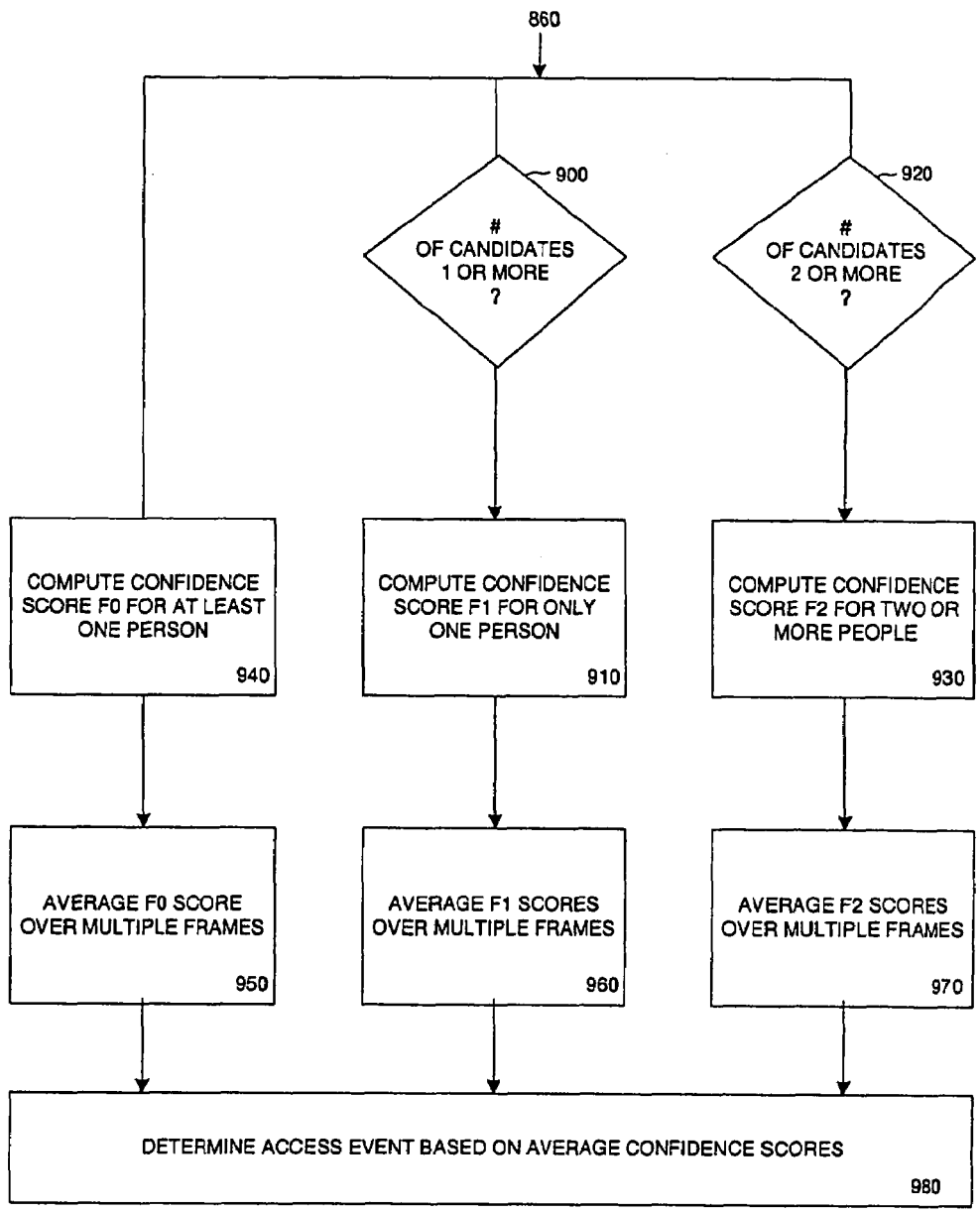
FIG. 14 is a flow diagram illustrating augmenting people candidates by confidence level scoring according to one embodiment.

FIG. 14 is a flow diagram illustrating augmenting people candidates by confidence level scoring according to one embodiment. The input to the scoring algorithm includes the list of validated people candidates and their locations in the filtered disparity map. In particular, the input can be a data structure (e.g., array or linked list data structure) in which the size of the data structure corresponds to the number of validated people candidates.

If, at 900, the number of validated people candidates is equal to one or more persons, a confidence score F1 can be generated at 910. The confidence score F1 corresponds to a confidence level that the target volume contains only one person. The confidence score F1 can be a value between 0 and 1.

If, at 920, the number of validated people candidates is equal to two or more persons, a confidence score F2 can be generated at 930. The confidence score F2 corresponds to a confidence level that the target volume contains two or more persons. The confidence score F2 can be a value between 0 and 1.

At 940, a confidence score F0 can be generated regardless of the number of validated people candidates. The confidence score F0 corresponds to a confidence level that the target volume contains at least one person. The confidence score F0 can be a value between 0 and 1.

At 950, 960, and 970 respectively, the confidence scores F0, F1, and F2 are each averaged with confidence scores from previous frames, resulting in average confidence scores $F0_{AVG}$, $F1^{AVG}$ and $F2^{AVG}$. In a preferred embodiment, the confidence scores F0, F1, F2 are weighted according to weights assigned to each frame. The weights are intended to filter out confidence scores generated from frames giving spurious results. According to one embodiment, the weights are generated by tracking the trajectories of people candidates as illustrated in FIGS. 18A through 18C.

Figure 15:
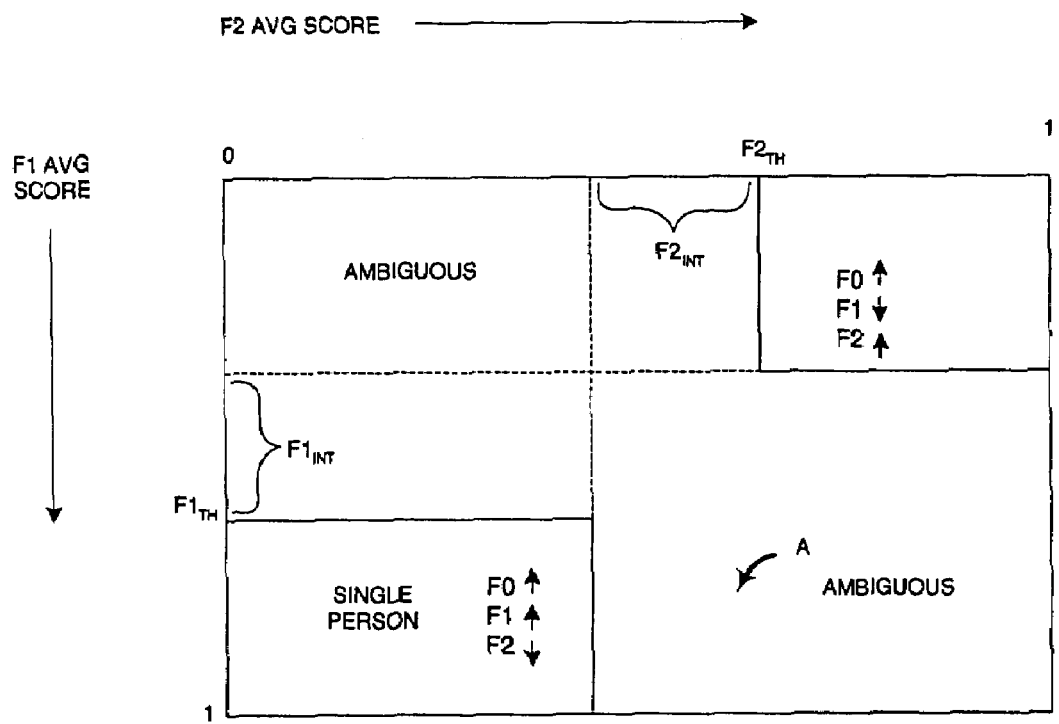
FIG. 15 is a block diagram illustrating a mapping between the average confidence scores and the corresponding access events according to one embodiment.

At 980, the average confidence scores $F0_{AVG}$, $F1_{AVG}$ and $F2^{AVG}$ are used to determine a portal access event, if any, as illustrated in FIG. 15. In particular, the event results may be generated (i) after a fixed number of input image frames, (ii) as soon as an access event is detected, (iii) based on the position of the door, or (iv) other criteria.

Event Mapping to Confidence Scores

FIG. 15 is a block diagram illustrating a mapping between the average confidence scores and the corresponding access events according to one embodiment. In a particular embodiment, there is a threshold value for each of the different types of confidence scores, $F0_{TH}$, $F1_{TH}$, and $F2^{TH}$. For clarity of this discussion, confidence scores that meet or exceed their threshold values are considered high, while confidence scores that are less than their threshold values are considered low. The determination of access events can be as follows.

For a single person event, the confidence scores F0 and F1 are high and the confidence score F2 is low. In other words, there is high confidence that there is at least one person in the target volume, and in particular only one person.

For a piggyback event, the confidence scores F0 and F2 are high and the confidence score F1 is low. In other words, there is high confidence that there is at least one person in the target volume, and in particular two or more people.

For a non-access event, all of the confidence scores F0, F1, and F2 are low. In other words, there is no confidence that there is anyone in the target volume.

Ambiguous events may also be triggered depending on the values of the average confidence scores. In particular, an ambiguous event can be triggered when the confidence scores provide conflicting results. For example, confidence scores F1 and F2 both being high indicate that a single person event and a piggyback event are in progress. Such an event is not possible and thus an ambiguous event can be triggered. Similarly, an ambiguous event can be triggered when the confidence score F0 is high indicating that at least one person is within the target volume, but confidence scores F1 and F2 do not confirm this event. Again, such an event is not possible and thus an ambiguous event can be triggered.

The threshold values can be configured such that an ambiguous event can be generated for intermediate but not determinative scores. For example, particular selection of the thresholds can result in ambiguous events being triggered even though a confidence score has reached its threshold.

For example, in FIG. 15, assume that point A corresponds to the confidence scores for F1 and F2. At A, confidence score F1 exceeds its threshold and thus indicates high confidence that a single person event is in progress. Because the confidence score F2 has not reached its threshold $F2^{TH}$, the confidence score F2 is not determinative of a piggyback event. However, the score for F2 is high enough within an intermediate region (e.g., $F2^{INT}$) such that there is some level of confidence that a piggyback event may be occurring. In such a case, an ambiguous event may be generated. Thus, in particular embodiments, events can be mapped to confidence scores such that tradeoffs between security and traffic flow can be taken into account.

Confidence Scores: F1 Scores

Figure 16A:
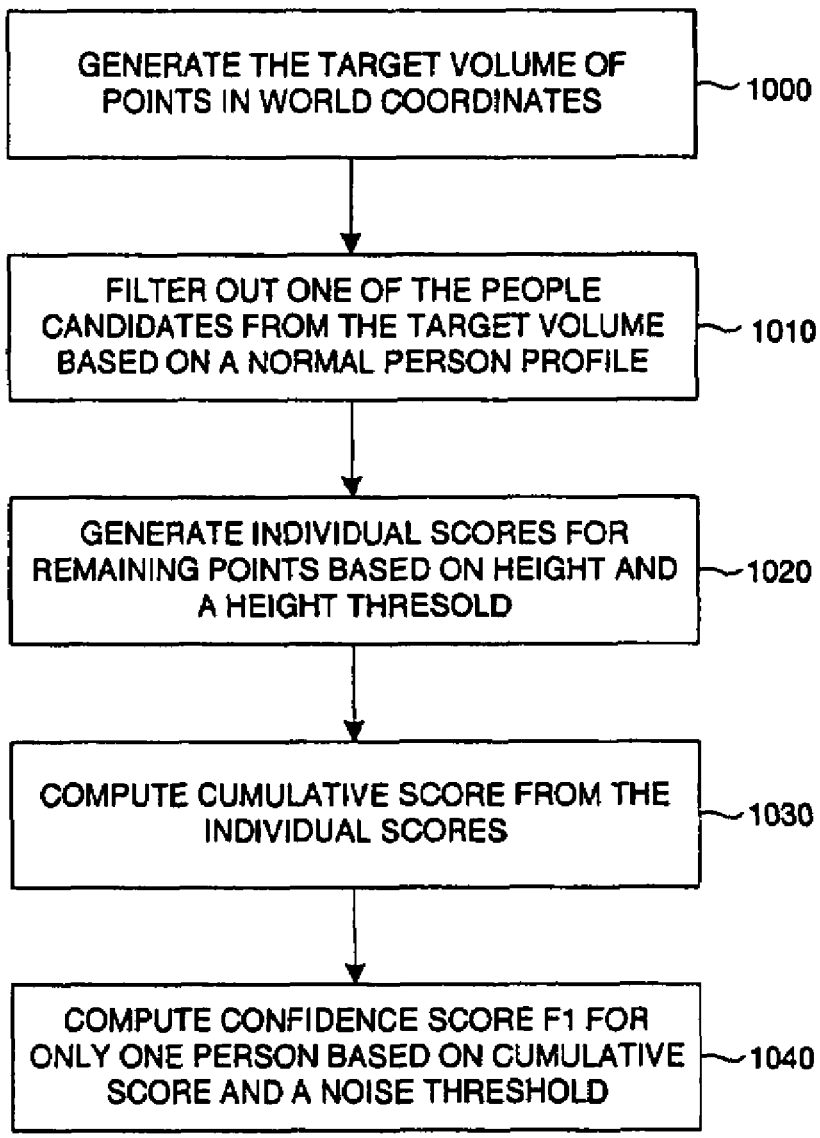
FIGS. 16A, 16B, and 16C are diagrams illustrating a process for determining a confidence score according to one embodiment.
Figure 16B:
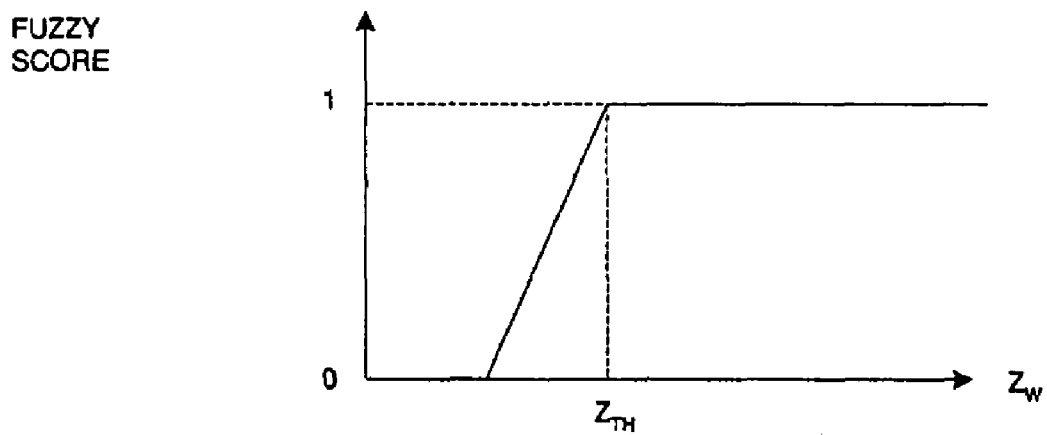
Figure 16C:
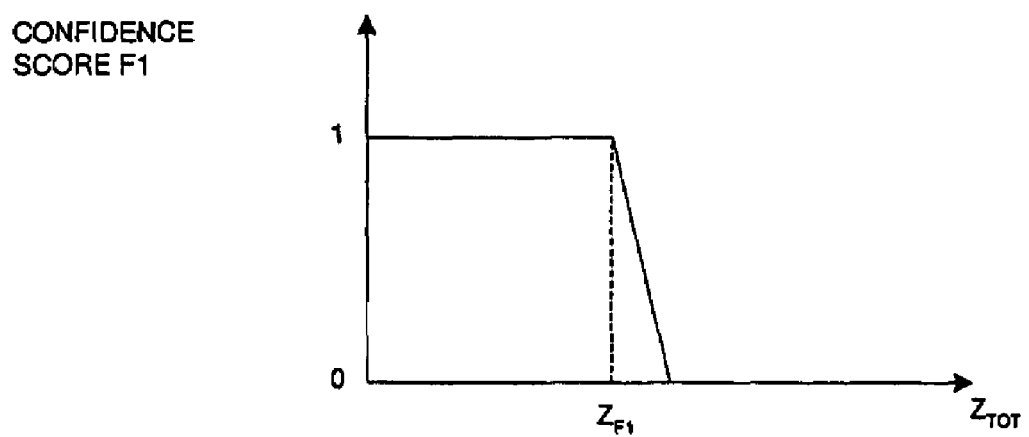

FIGS. 16A, 16B, and 16C are diagrams illustrating a process for determining a confidence score according to one embodiment. In particular, FIG. 16A is a flow diagram illustrating a particular process for determining a confidence score F1 that corresponds to the confidence level that only one person is within the target volume.

At 1000, the target volume of points is generated in 3D world coordinates. In particular embodiments, this can be accomplished by first generating 3D camera coordinates ($X_C$, $Y_C$, $Z_C$) from the filtered disparity map of points ($X_R$, $Y_R$, D), and the camera geometry as previously described. The 3D camera coordinates ($X_C$, $Y_C$, $Z_C$) are then transformed into world coordinates ($X_W$, $Y_W$, $Z_W$) by applying the camera to world coordinate system transform of FIG. 9.

At 1010, one of the validated people candidates are filtered out from the target volume based on the head and shoulder profile of a normal person. By removing one of the candidates from the target volume, a confidence score F1 can be generated indicating a confidence level that the target volume contains only one person (i.e., the removed candidate).

According to one embodiment, the selected candidate is filtered out using a elliptical filtering volume that corresponds to the head/shoulder profile of a typical person. For example, from a top view, a typical person has a head/shoulder profile which is elliptical in shape. By knowing the head location of the selected candidate and the relative position of the door, an elliptical filtering volume can be generated in an orientation that encompasses the selected candidate in the target volume.

The 3D world coordinates within the target volume that also fall within the elliptical filtering volume of the normal person profile are then filtered out, effectively removing the selected people candidate from the target volume. If there are no other candidates in the target volume, the confidence score F1 should be high. Conversely, if there is at least one person, the confidence score F1 should be low indicating that there is little confidence that the removed candidate is the only person in the target volume.

At 1020, an individual score (i.e. "fuzzy" score) is generated for each of the remaining, non-filtered points based on their heights relative to a height threshold. For example, in FIG. 16B, if the height $Z_W$ for a 3D point in the target volume is greater than the height threshold $Z_{TH}$, a high individual score (e.g. equal to 1) is awarded. Conversely, if the height $Z_W$ is less than the height threshold $Z_{TH}$, a low individual score (e.g. equal to 0) is awarded. For intermediate height values of $Z_W$ relative to the height threshold $Z_{TH}$ receive an intermediate individual score (e.g., between 0 and 1), for example, according to a ramp function.

At 1030, a cumulative score $Z_{TOT}$ is generated from the individual scores.

At 1040, a confidence score F1 corresponding to the confidence level that only one person is within the target volume is computed. In particular embodiments, the confidence score is based on the cumulative score $Z_{TOT}$ and a noise threshold $Z_{F1}$. For example, in FIG. 16C, if the cumulative score $Z_{TOT}$ is less than the noise threshold $Z_{F1}$ then the confidence level is high (e.g. F1=1) that the target volume contains only the people candidate who was filtered out. Conversely, if the cumulative score $Z_{TOT}$ is greater than the noise threshold $Z_{F1}$, then the confidence level is intermediate to low (e.g., $1 > F1 \geq 0$) that the removed candidate is the only one person in the target volume.

Confidence Scores: F0 Scores

Figure 17A:
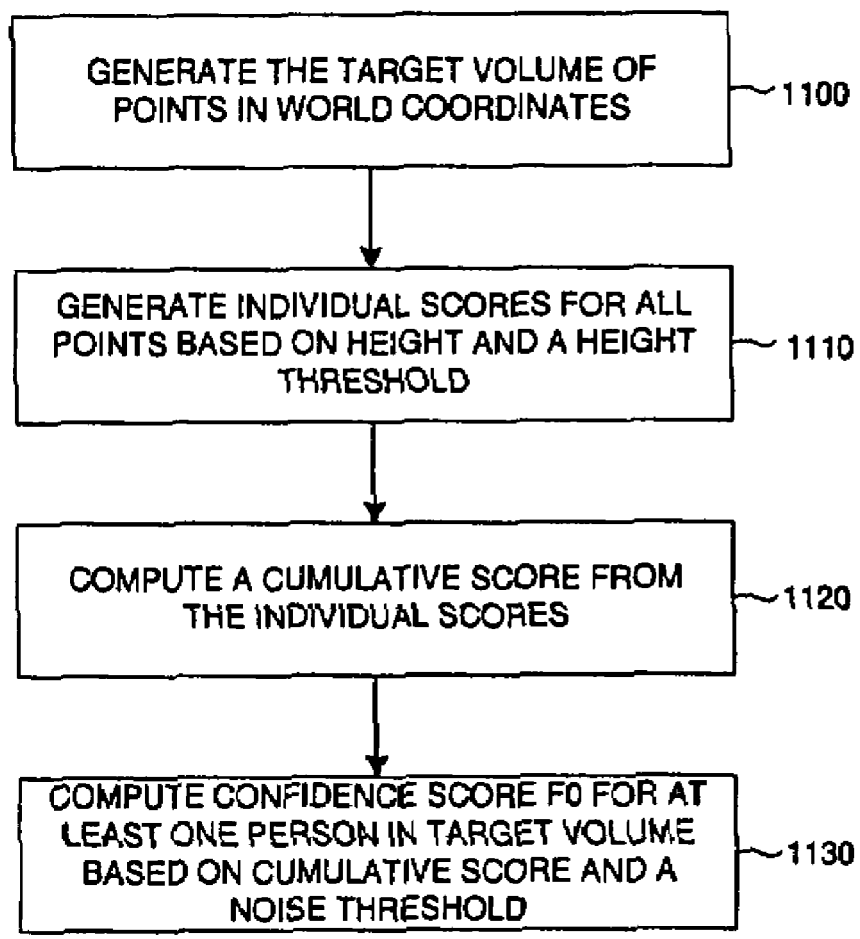
FIGS. 17A and 17B are diagrams illustrating a process for determining a confidence score according to another embodiment.
Figure 17B:
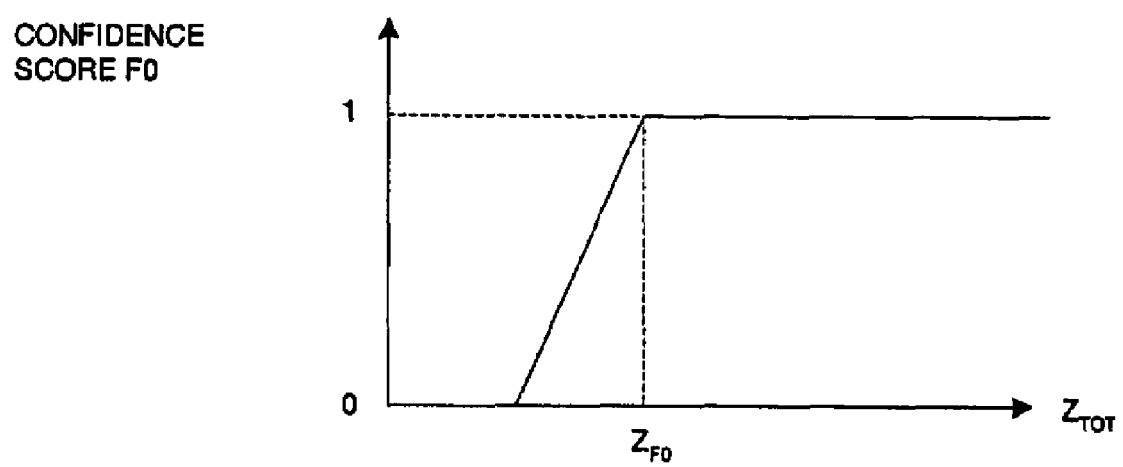
Figure 18A:
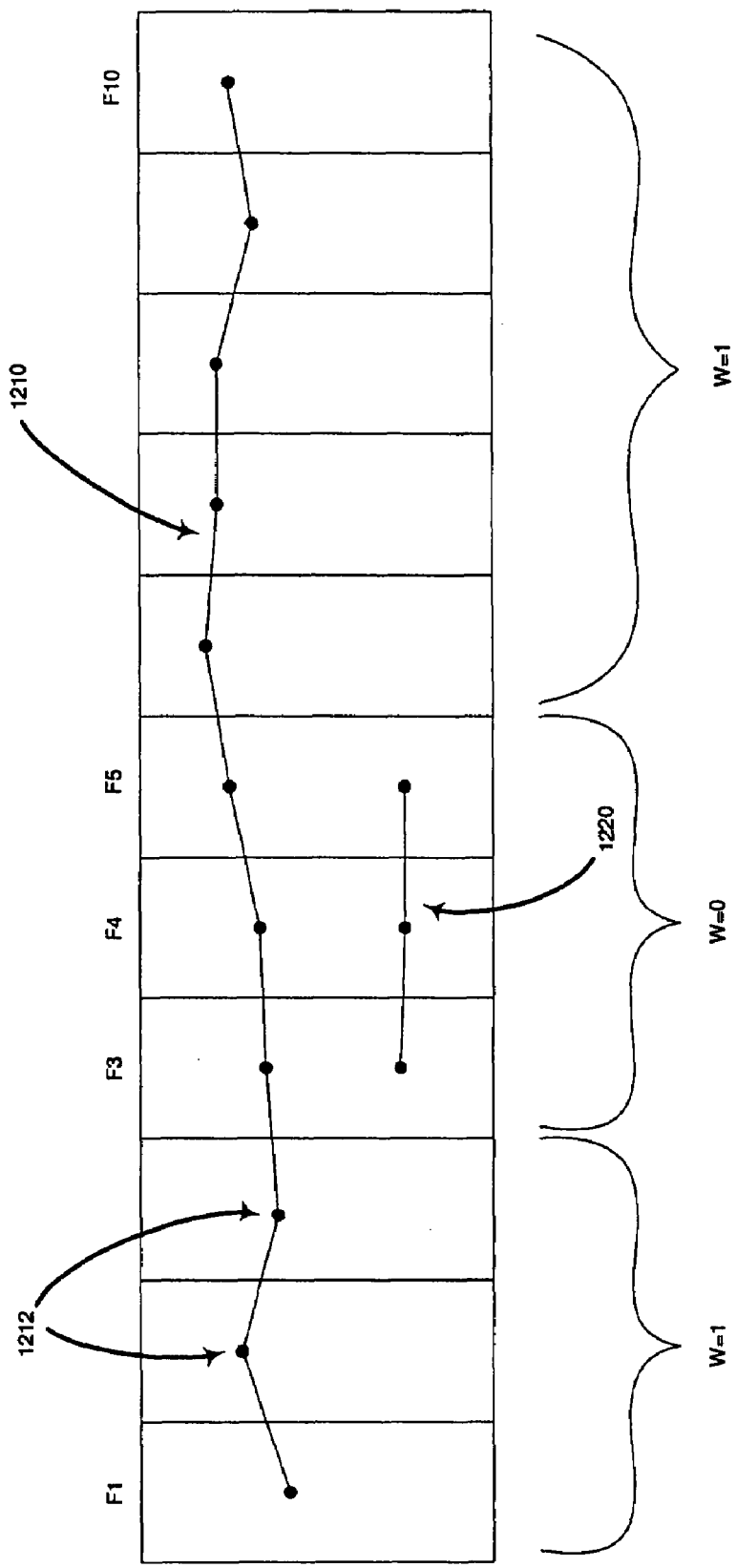
FIG. 18A is a block diagram illustrating tracking of people candidates according to one embodiment.
Figure 18B:
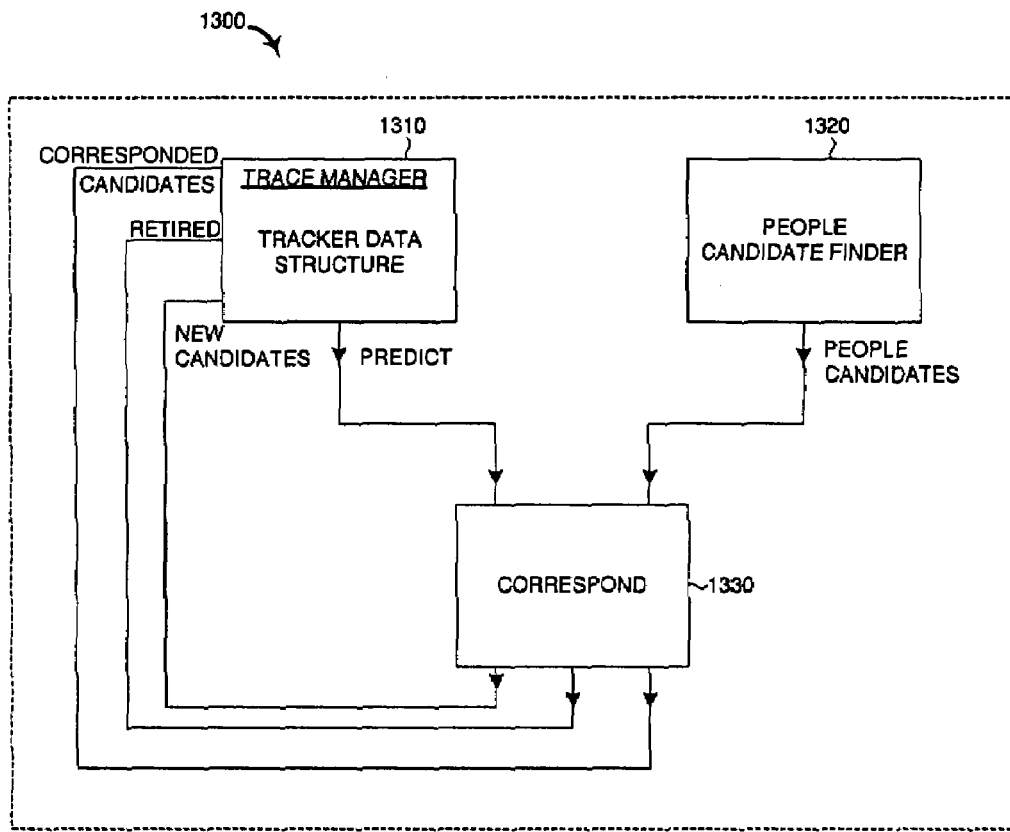
FIG. 18B is a block diagram illustrating a system for tracking people candidates according to one embodiment.
Figure 18C:
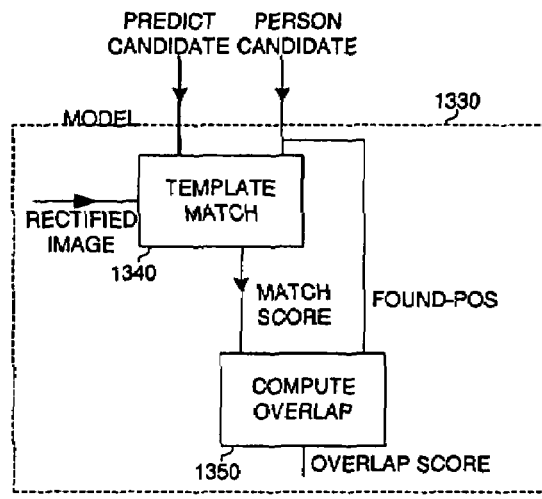
FIG. 18C is a block diagram illustrating a correspondence module according to one embodiment.

FIGS. 17A and 17B are diagrams illustrating a process for determining a confidence score according to another embodiment. In particular, FIG. 17A is a flow diagram illustrating a particular process for determining a confidence score F0 that corresponds to a confidence level that at least one person is within the target volume. This process is similar to the confidence scoring described in FIGS. 16A through 16C. However, for F0 confidence scores, individual scores are computed for all of the points within the target volume.

At 1100, the target volume of points is generated in 3D world coordinates.

At 1110, an individual score (i.e. "fuzzy" score) is generated for each point within the target volume based on their heights relative to a height threshold. For example, referring to FIG. 16B, if the height $Z_W$ for a 3D point in the target volume is greater than the height threshold $Z_{TH}$, a high individual score (e.g. equal to 1) is awarded. Conversely, if the height $Z_W$ is less than the height threshold $Z_{TH}$, a low individual score (e.g. equal to 0) is awarded. For intermediate height values of $Z_W$ relative to the height threshold $Z_{TH}$ receive an intermediate individual score (e.g., between 0 and 1), for example, according to a ramp function.

At 1120, a cumulative score $Z_{TOT}$ is generated from the individual scores.

At 1130, a confidence score F0 corresponding to the confidence level that at least one person is within the target volume is computed. In particular embodiments, the confidence score is based on the cumulative score $Z_{TOT}$ and a noise threshold $Z_{F0}$. For example, in FIG. 17B, if the cumulative score $Z_{TOT}$ is greater than the noise threshold $Z_{F0}$ then the confidence level is high (e.g. F0=1) that the target volume contains at least one person. Conversely, if the cumulative score $Z_{TOT}$ is less than the noise threshold $Z_{F0}$, then the confidence level is intermediate to low (e.g., 1>F0>0) that there is at least one person in the target volume.

Confidence Scores: F2 Scores

Referring back to FIG. 14, at 930, the confidence score F2 which indicates the confidence level that two or more people are within the target volume may be determined based on the separation between the head locations of the validated people candidates. For example, if the separation between the head locations of the validated people is too close, a low confidence score F2 may be generated. Conversely, if the separation between the head locations is typical of two people walking next to one another, a high confidence score F2 may be generated. In another embodiment, template matching similar to that described in the fine segmentation process may be used to perform template matching in which the resultant scores are used to determine a confidence score for two or more candidates in a target volume.

In another embodiment, the confidence score F2 may simply be 1 or 0 depending on whether two or more persons were identified during the coarse and fine segmentation of people candidates within in the target volume.

Trajectory Tracking of People Candidates

FIG. 18A is a block diagram illustrating tracking of people candidates according to one embodiment. In particular embodiments, a set of traces is generated over a sequence of frames. Each trace in the set corresponds to a trajectory of a people candidates over the sequence of frames. In particular, each point in a trace corresponds to a position of a candidate within the target volume. A point at the beginning of a trace corresponds to a new candidate, while a point at the end of a trace corresponds to a trace being retired. For example, in FIG. 18A, two traces are illustrated in which trace 1210 has a long frame duration of ten frames and trace 1220 having a short frame duration of three frames.

Weights are assigned to each frame in the sequence of frames. According to one embodiment, a uniform weight can be assigned to each frame in the sequence unless the set of traces includes a single long trace indicative of the trajectory of a single person and a short trace that is generated over a set of frames that is substantially less than the first trace. In that case, the weights assigned to the set of frames that generated the second trace are assigned a weight less than the uniform weight. This is because short traces are considered unreliable evidence of a people candidate moving within a target volume.

For example, in FIG. 18A, trace 1220 has a frame duration that is substantially less than the single long trace 1210. Thus, for frames F3, F4, and F5 from which the short trace 1220 was generated, a weight (e.g., W=0) is assigned that is less than the uniform weight (e.g., W=1), which is applied to the remaining frames. By assigning a lesser weight to the frames generating the shorter trace, the tracker discounts information from those frames which may be providing erroneous readings of a second candidate moving within the target volume. Rather the short trace may be due to another part of the person's body (e.g., shoulder, neck) rather than the head.

Conversely, if the set of traces includes a two or more long traces indicative of the trajectory of a two or more people and a short trace, the same uniform weight can be applied to all frames. In other words, by having two or more long traces present, the addition of the short trace does not change the fact that two or more trajectories of people candidates are being tracked in the target volume.

The weights to each frame (e.g., W=0, W=1) are then applied to confidence scores F2 for those frames. For example, in FIG. 18A, the confidence scores F2 that correspond to frames F3, F4, F5 are multiplied by a weight of zero (0), while the confidence scores F2 for the remaining frames are multiplied by a weight of one (1). By weighting the confidence scores for frames F3, F4, and F5 to zero, the resulting average confidence scores $F2^{AVG}$ are not affected by the unreliable confidence scores generated for those frames. Thus, more accurate average confidence scores can be generated and used to detect portal access events within the target volume.

FIG. 18B is a block diagram illustrating a system for tracking people candidates according to one embodiment. In the illustrated embodiment, the system includes a tracking module 1300 that keeps track of people candidates through multiple frames. It provides the trajectory of a person candidate and filters candidates that do not correspond to the head of a person. The latter stems from the fact that only the top of the head that is visible in all the frames as opposed to a shoulder or another body part which tend to get occluded by other parts of the body. In this case any traces that are too short are typically discarded. This feature is very useful both in all types of portals: revolving doors, swinging doors, sliding doors and man traps. The trajectory feature is particularly useful for swinging door and sliding door portals where it is important to distinguish between entry events and exit events. The system could be configured to violate on either multiple entry events or multiple exit events or multiple combination events in a single door open/close cycle to produce violations.

In particular embodiments, the tracking module 1300 includes a tracking data structure called the trace manager 1310 which keeps track of all the traces that are in progress and all the traces that have been retired. Based on all the traces that are in progress until the previous frame, the trace manager 1310 predicts where the person candidate is in the current frame (1 person/trace). For example, the trace manager 1310 can compute trajectories of traces based on the last N points by standard line fit techniques by assuming that the motions can be approximated by piecewise linear segments of length N. The trajectories are computed in world coordinates so that one can determine their orientation relative to the portal thereby enabling one to distinguish between entry events, exit events and events that do not matter (people walking parallel to the door).

The predicted trajectories are passed into the correspondence module 1330 along with detected locations of people candidates resulting from the fine people candidate segmentation process. The correspondence module 1330 attempts to match the predicted people candidate positions with the detected people candidate positions. The correspondence module 1330 identifies people candidates that are matched and not matched and forwards this data back to the trace manager 1310. The tracker updates the traces with the detected positions of people candidates for which correspondence was found and retires the traces for which it did not. If there are new fine people candidates that did not correspond to any of the traces then they are called new candidates and start a new trace in the trace manager 1310. This is preferably implemented as a Kalman filter. For more information regarding Kalman filters, refer to R. E. Kalman, "A New Approach to Linear Filtering and Prediction Problems," *Transactions of the ASME, The Journal of Basic Engineering*, 8:35-45, 1960, the entire contents of which are incorporated herein by reference.

FIG. 18C is a block diagram illustrating a correspondence module according to one embodiment. In particular, the correspondence module 1330 attempts to match a predicted position of a people candidate to an actual position of the candidate against a rectified two dimensional reference image. According to one embodiment, an image window is taken around a predicted window and is considered to be the template. A point template matching can be performed around the position of the actual candidate. Point template matching is preferable because the two points (e.g., the predicted point and the detected point) might not correspond to the same point on the head since a head is relatively flat to the camera. Based on the degree of match determined at 1340 and the 3D overlap determined at 1350 between the found result and actual candidate, a correspondence score can be obtained. Pairs that have a high correspondence relative to one another and simultaneously low correspondence to everybody else indicate a valid match.

Referring back to FIG. 18B, the trace manager 1310 is a data structure which contains the people candidates from the various frames. A reset signal can be issued which clears the trace manager 1310 of all the people candidates and sets the frame count to zero. This reset signal is produced when a door opens (e.g., swinging door/sliding door) or when an encoder angle hits the start angle (e.g., revolving door). From then on a frames are received on which processing is done and the frame count is increased by 1. A final event is produced when the door position hits a certain value (e.g., door being closed or encoder count reaching a certain value). In the former case the events are produced at the end and the evaluation is done over all the frames produced, such as in the case of a revolving door.

Alternatively, one might be interested in producing a result in real-time i.e. as soon as a violation is detected. In this case the results are evaluated every frame for all the frames since the cycle began for all traces, a single trace can only produce an Exit event or an Entry Event which are then accumulated and soon as a violation is detected (based on the application criteria) a violation is issued.

In either case if a trace is small the frames which it contributed too are re-evaluated for the fuzzy confidence scores with the discarded candidates.

While this invention has been particularly shown and described with references to preferred embodiments thereof, it will be understood by those skilled in the art that various changes in form and details may be made therein without departing from the scope of the invention encompassed by the appended claims.

What is claimed is:

1. A portal security system, comprising:
   a sensor capturing plural 2D images of a field of view about a portal;
   a 3D imaging system generating a target volume from the plural 2D images of the field of view about the portal, the portal defining a moving volume through which a person passes from an entrance to an exit; and
   a processor dynamically varying a position of the target volume within the field of view as the moving volume moves through the field of view, the processor varying the position to correspond to the moving volume according to a position of the portal, the processor detecting and tracking people candidates moving through the target volume to detect a portal access event.

2. The portal security system of claim 1 wherein the target volume is less than the field of view.

3. The portal security system of claim 1, wherein the target volume has a depth less than a depth associated with the field of view.

4. The portal security system of claim 1 wherein the portal access event is a piggyback event.

5. The portal security system of claim 1 wherein the portal access event is a person event that triggers a tailgating event.

6. The portal security system of claim 1 wherein the portal access event is a person event that activates the portal.

7. The portal security system of claim 1 wherein the portal access event is an ambiguous event.

8. The portal security system of claim 1, further comprising:
   plural cameras receiving plural 2D images of a field of view about a portal
   a 3D image generator generating a 3D model from the plural 2D images;
   a filter providing a target volume from the 3D model;
   a people candidate detector detecting people candidates within the target volume; and
   a people candidate tracker tracking movement of the people candidates over time to detect portal access events.

9. The portal security system of claim 1 where the portal is a revolving door.

10. The portal security system of claim 1, wherein the processor automatically calibrates a 3D coordinate system that corresponds to a 3D coordinate system of a portal scene.

11. A portal security system, comprising:
    a 3D imaging system generating an entry target volume and an exit target volume, the entry target volume being generated from plural 2D images of a field of view about an entry of a portal, the exit target volume being generated from plural 2D images of a field of view about an exit of the portal, at least a subset of the exit target volume being locally distinct from the entry target volume; and a processor dynamically varying position of the entry target volume and the exit target volume within the respective fields of view to correspond to respective moving volumes defined by the portal, the respective moving volumes moving through the respective fields of view, the processor detecting and tracking people candidates moving through the entry target volume and the exit target volume to detect a portal access event.

12. A method of providing portal security, comprising:
capturing plural 2D images of a field of view about a portal;
generating a target volume from the plural 2D images of the field of view about the portal, the portal defining a moving volume through which a person passes from an entrance to an exit;
dynamically varying a position of a target volume within the field of view as the moving volume moves through the field of view, a processor varying the position to correspond to the moving volume according to a position of the portal,
detecting people candidates within the target volume; and
tracking the people candidates moving through the target volume to detect a portal access event.

13. The method of claim 12 wherein the target volume is less than the field of view.

14. The method of claim 12, wherein the target volume has a depth less than a depth associated with the field of view.

15. The method of claim 12 wherein the portal access event is a piggyback event.

16. The method of claim 12 wherein the portal access event is a person event that triggers a tailgating event.

17. The method of claim 12 wherein the portal access event is a person event that activates the portal.

18. The method of claim 12 wherein the portal access event is an ambiguous event.

19. The method of claim 12, further comprising:
receiving plural 2D images of a field of view about a portal;
generating a 3D model from the 2D images;
providing a target volume from the 3D model;
detecting people candidates within the target volume; and
tracking movement of the people candidates over time to detect portal access events.

20. The method of claim 12 wherein the portal is a revolving door, a sliding door, a swinging door, or a man trap.

21. The method of claim 12 wherein detecting people candidates comprises
generating a low resolution representation having a topological profile of the target volume;
identifying a location of a peak within the low resolution representation; and
converting the location of the peak into an approximate location of a people candidate in a high resolution representation of the target volume.

22. The method of claim 12 wherein detecting people candidates comprises
generating a head template having dimensions corresponding to a height and an approximate location of a people candidate; and
determining a fine location of the people candidate by matching the height of the people candidate to heights within an area of a representation of the target volume the area corresponding to the dimensions of the head template.

23. The method of claim 22, further comprising:
determining a distribution of heights within the area corresponding to the dimensions of the head template and the fine location of the people candidate; and
discarding the people candidate if the distribution of heights covers less than a height distribution for a head of a person.

24. The method of claim 22, further comprising:
determining plural fine locations for plural people candidates;
comparing the plural fine locations in three dimensional space;
discarding at least one of the plural people candidates having a fine location that overlaps with another fine location of another people candidate.

25. The method of claim 12, wherein tracking the people candidates comprises:
generating confidence scores corresponding to numbers of people candidates being within the target volume; and
detecting the portal access event from a series of the generated confidence scores.

26. The method of claim 25, further comprising generating confidence scores corresponding to at least one person being within the target volume by:
generating a target volume in three dimensional space;
generating individual scores for three dimensional points within the target volume, each of the individual scores corresponding to a height of one of the three dimensional points relative to a height threshold;
generating a cumulative score from the individual scores; and
computing a confidence score corresponding to at least one person being within the target volume based on the cumulative score and a second threshold.

27. The method of claim 25 further comprising generating confidence scores corresponding to two or more people being within the target volume based on a separation between head locations of the people candidates.

28. The method of claim 25 further comprising generating confidence scores corresponding to two or more people being within the target volume based on a template score generated from matching head templates to head locations of the people candidates.

29. The method of claim 12 further comprising:
automatically calibrating a 3D coordinate system that corresponds to a 3D coordinate system of a portal scene.

30. The method of claim 12, further comprising controlling access to the portal according to the portal access event.

31. The method of claim 12, further comprising reporting an alert based on the portal access event.

32. A method of providing portal security, comprising:
generating an entry target volume from plural 2D images of a field of view about an entry of a portal;
generating an exit target volume from plural 2D images of a field of view about an exit of the portal, at least a subset of the exit target volume being locally distinct from the entry target volume;
dynamically varying position of the entry target volume and the exit target volume within the respective fields of view to correspond to respective moving volumes defined by the portal, the respective moving volumes moving through the respective fields of view;
detecting people candidates within the entry target volume and the exit target volume; and tracking the people candidates moving through the entry target volume and the exit target volume to detect a portal access event.

33. The method of claim 32, further comprising controlling access to the portal according to the portal access event.

34. The method of claim 32, further comprising reporting an alert based on the portal access event.

35. A method of providing portal security, comprising:
generating a target volume from plural 2D images of a field of view about a portal; and
detecting people candidates within the target volume;
tracking the people candidates moving trough the target volume to detect a portal access event, wherein tracking the people candidates comprises:
   generating confidence scores corresponding to numbers of people candidates being within the target volume; and
   detecting the portal access event from a series of the generated confidence scores; and
generating confidence scores corresponding to only one person being within the target volume by:
generating a target volume in three dimensional space;
removing a portion of the target volume that corresponds to one of the people candidates in the target volume;
generating individual scores for three dimensional points remaining within the target volume, each of the individual scores corresponding to a height of one of the remaining three dimensional points relative to a height threshold;
generating a cumulative score from the individual scores; and
computing a confidence score corresponding to only one person being within the target volume based on the cumulative score and a second threshold.

36. A method of providing portal security, comprising:
generating a target volume from plural 2D images of a field of view about a portal, the portal defining a moving volume through which a person passes from an entrance to an exit;
dynamically varying a position of a target volume to correspond to the moving volume according to a position of the portal;
detecting people candidates within the target volume; and
tracking the people candidates moving through the target volume to detect a portal access event;
wherein tracking the people candidates comprises:
generating confidence scores corresponding to numbers of people candidates being within the target volume;
detecting the portal access event from a series of the generated confidence scores;
generating a set of traces over a sequence of frames, each trace in the set corresponding to a trajectory of a people candidate during the sequence of frames;
assigning weights to the sequence of frames, such that the weights are a uniform weight unless the set of traces includes a first trace and a second trace with the second trace being generated over a set of frames that is substantially less than the first trace, the weights assigned to the set of frames that generated the second trace being assigned a weight less than the uniform weight; and
applying the assigned weights of the sequence of frames to the confidence scores of corresponding frames.

* * * * *